(12) United States Patent
Wimmer

(10) Patent No.: US 7,364,178 B2
(45) Date of Patent: **\*Apr. 29, 2008**

(54) FRONT WHEEL SUSPENSION SYSTEM FOR VEHICLES HAVING A SINGLE FRONT WHEEL

(76) Inventor: Martin F. Wimmer, 18A Yong Long GE Yong Xing Garden, NR. 100, Xin Geng Road, Shanghai (CN) 200030

( * ) Notice: Subject to any disclaimer, the term of this patent is extended or adjusted under 35 U.S.C. 154(b) by 43 days.

This patent is subject to a terminal disclaimer.

(21) Appl. No.: 11/424,146

(22) Filed: Jun. 14, 2006

(65) Prior Publication Data

US 2006/0220343 A1    Oct. 5, 2006

Related U.S. Application Data

(62) Division of application No. 10/628,536, filed on Jul. 28, 2003, now Pat. No. 7,140,627.

(51) Int. Cl.
*B62K 25/08* (2006.01)

(52) U.S. Cl. .............................. 280/276; 280/283

(58) Field of Classification Search ............... 280/275, 280/276, 277, 278, 287, 281.1, 283
See application file for complete search history.

(56) References Cited

U.S. PATENT DOCUMENTS

| | | |
|---|---|---|
| 3,866,946 A | 2/1975 | Robison |
| 3,944,254 A | 3/1976 | Inui |
| 4,162,797 A | 7/1979 | McBride |
| 4,388,978 A | 6/1983 | Fior et al. |
| 4,572,534 A | 2/1986 | Heyl |
| 4,738,468 A | 4/1988 | Baron |
| 5,462,302 A | 10/1995 | Keitner |
| 5,498,014 A | 3/1996 | Kulhawik et al. |
| 5,782,313 A | 7/1998 | Kurawaki et al. |
| 5,799,963 A | 9/1998 | Berkmann |
| 5,839,536 A | 11/1998 | Tanaka |
| 5,921,339 A | 7/1999 | Matsuura |
| 5,964,312 A | 10/1999 | Maldonado |
| 5,967,538 A | 10/1999 | Callaluca et al. |
| 6,089,585 A | 7/2000 | Theobald |
| 6,149,173 A | 11/2000 | Bynoe |
| 6,164,675 A | 12/2000 | Pickering |
| 6,182,993 B1 | 2/2001 | Berkmann |
| 6,199,885 B1 | 3/2001 | Seidl |
| 6,244,609 B1 | 6/2001 | Wilson |

(Continued)

FOREIGN PATENT DOCUMENTS

FR    2744980    8/1997

(Continued)

*Primary Examiner*—Anne Marie Boehler
(74) *Attorney, Agent, or Firm*—James C. Nemmers

(57) ABSTRACT

A suspension system for the front wheel of single wheeled vehicles having a single front wheel, such as bicycles, tricycles and motorcycles. The suspension system consists of a frame with a variable arrangement of the steering points using at least one swingable arm, multiple fork joints at least one of which is designed as a two-part fork joint that provides for variable distances between the steering axis, and a telescopic fork connected to the front wheel and which has at least three parts so that the front wheel is guided through the entire system whether partly or fully sprung.

15 Claims, 23 Drawing Sheets

U.S. PATENT DOCUMENTS

| | | |
|---|---|---|
| 6,260,869 B1 | 7/2001 | Hanlon et al. |
| 6,357,546 B1 | 3/2002 | Crosby, Jr. |
| 6,371,263 B1 | 4/2002 | Hoose |
| 6,402,175 B1 | 6/2002 | Jansson |
| 6,533,305 B1 | 3/2003 | Falk |
| 6,786,499 B2 | 9/2004 | Ackley |
| 7,140,627 B2 * | 11/2006 | Wimmer ................ 280/276 |

FOREIGN PATENT DOCUMENTS

| | | |
|---|---|---|
| WO | 9603307 | 2/1996 |
| WO | 0128847 | 4/2001 |

* cited by examiner

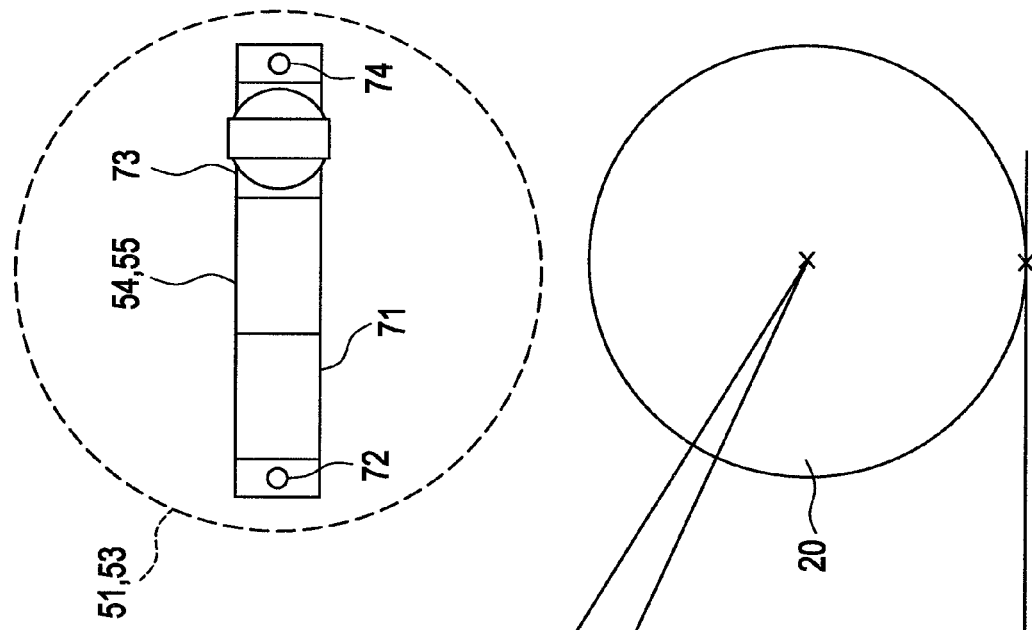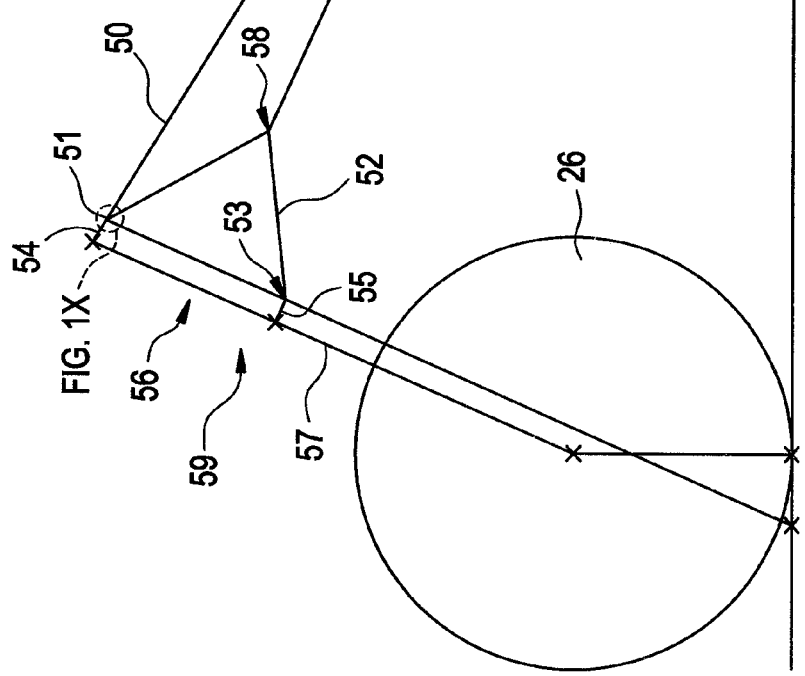

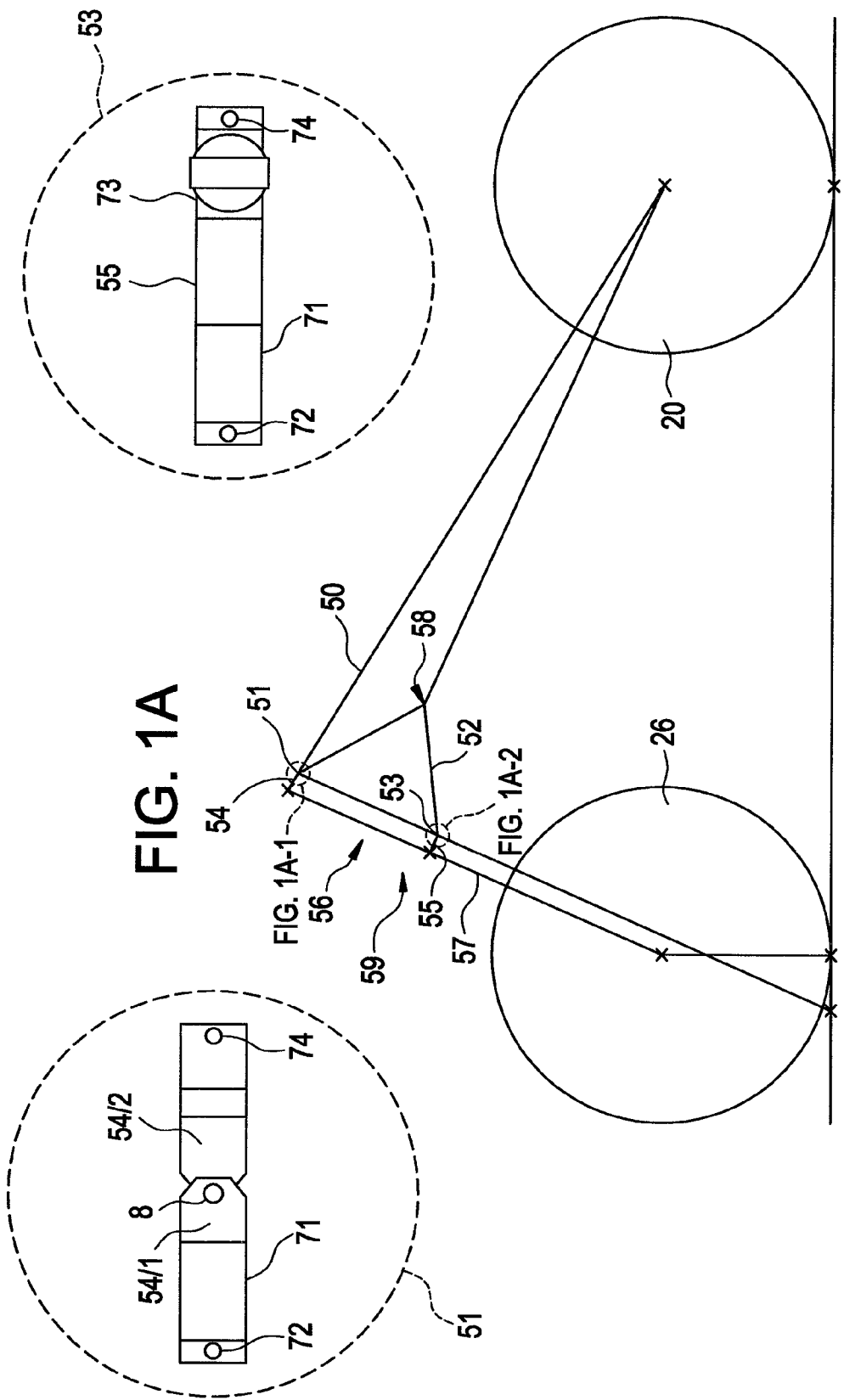

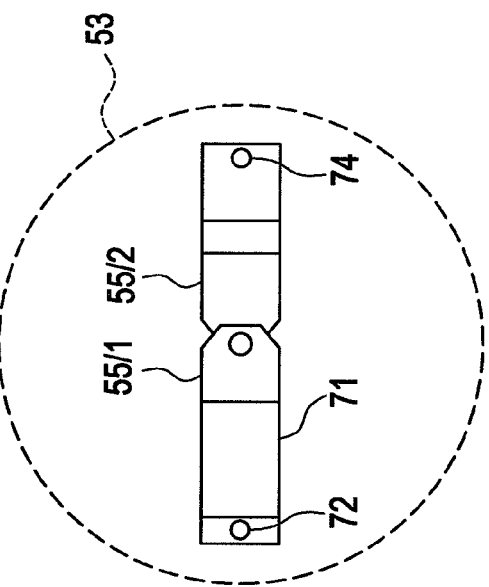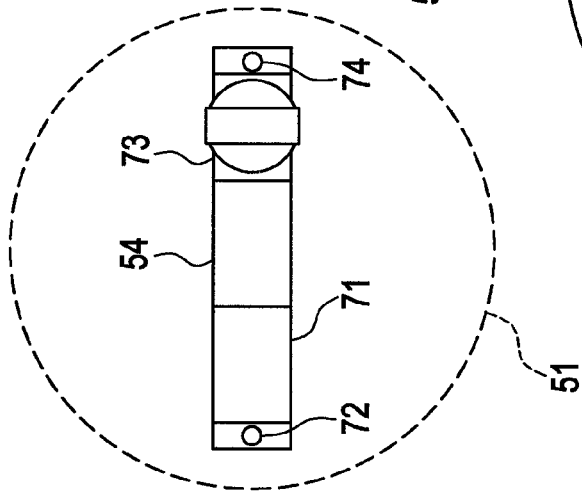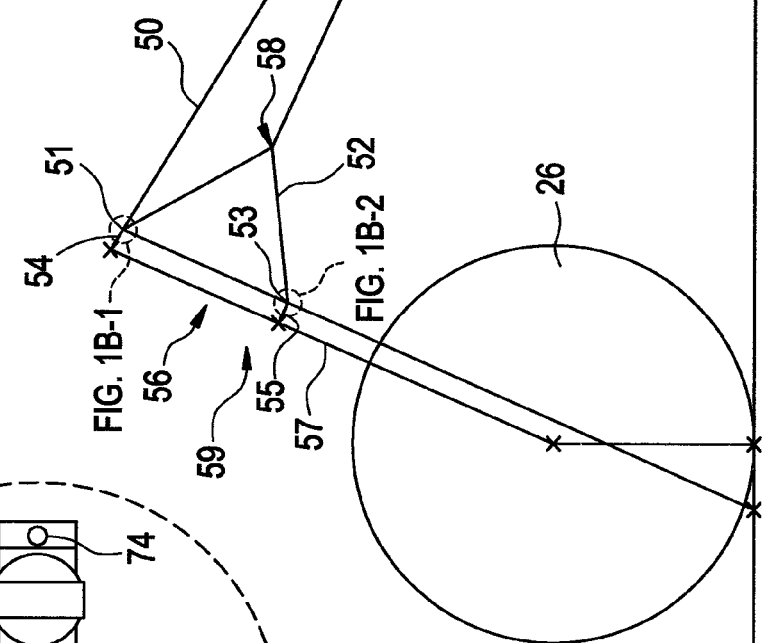

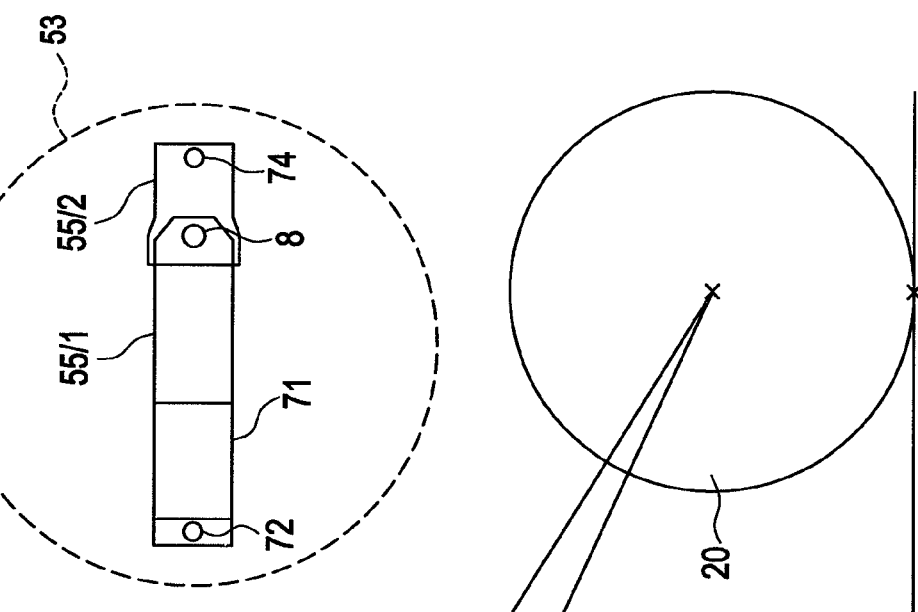
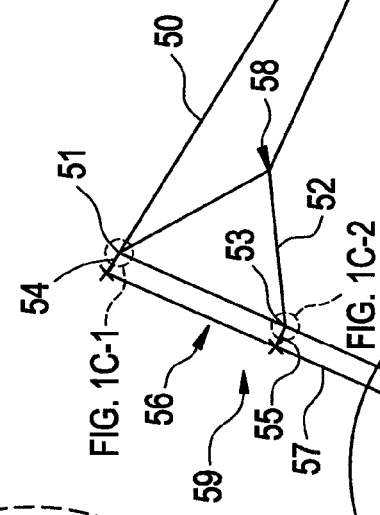
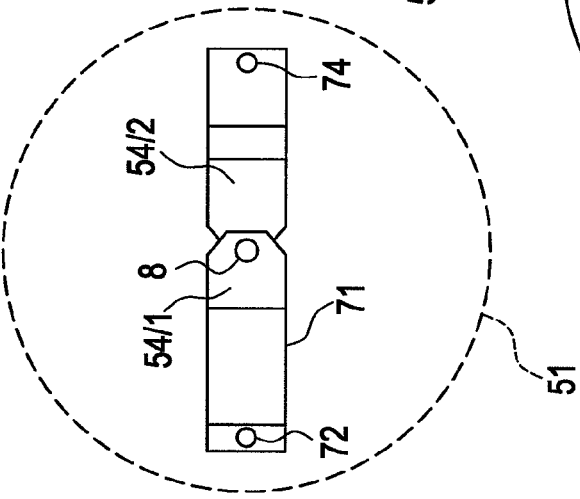

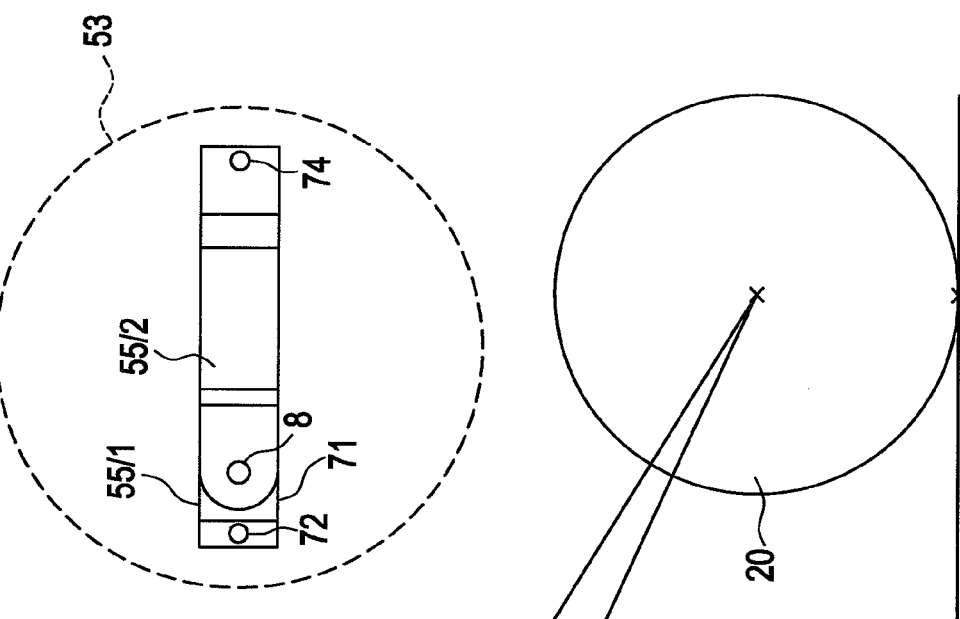
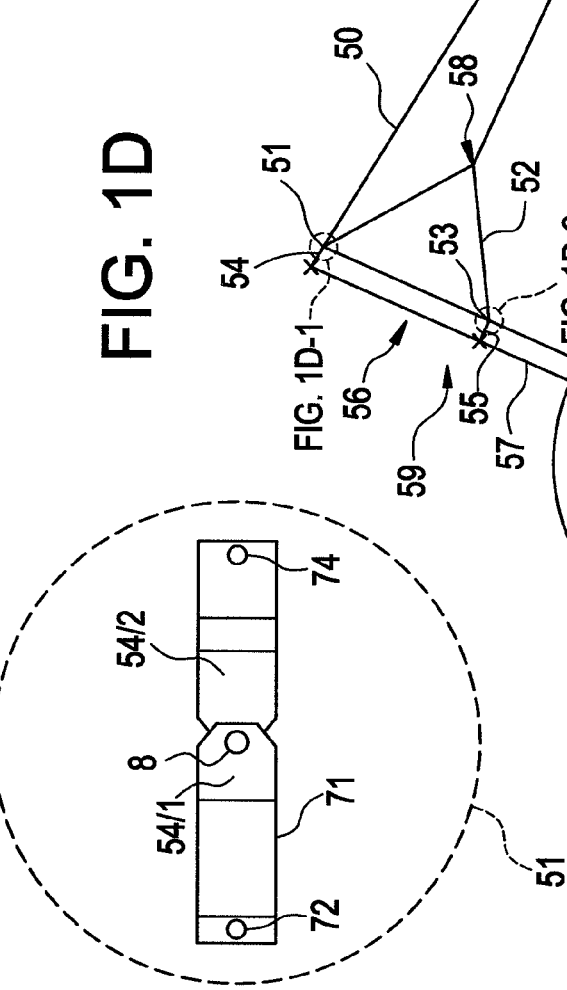

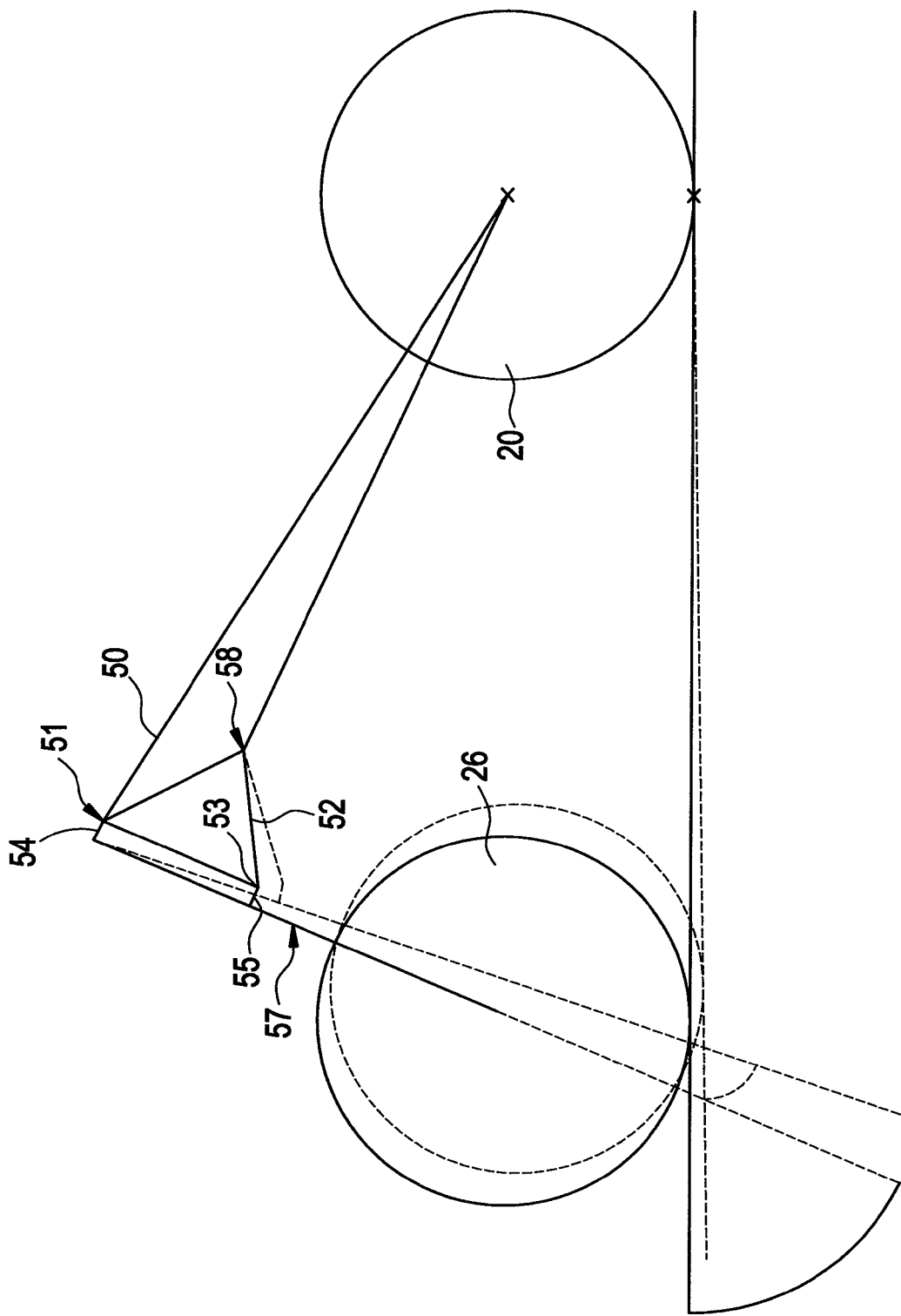

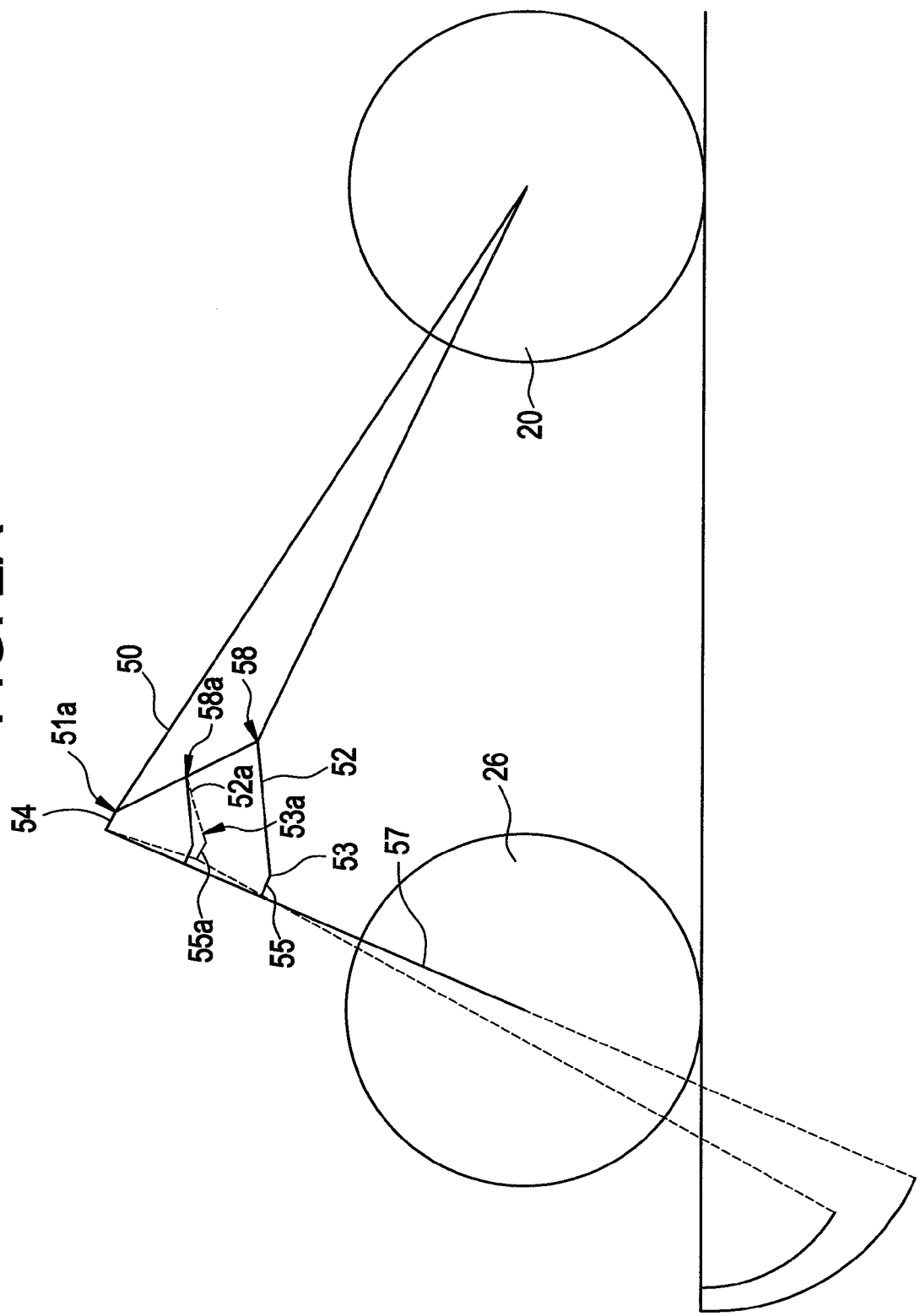

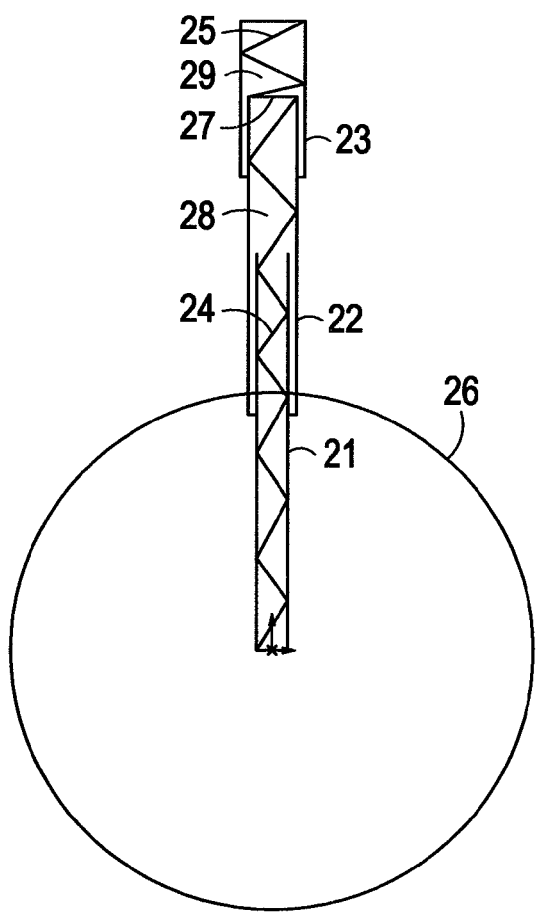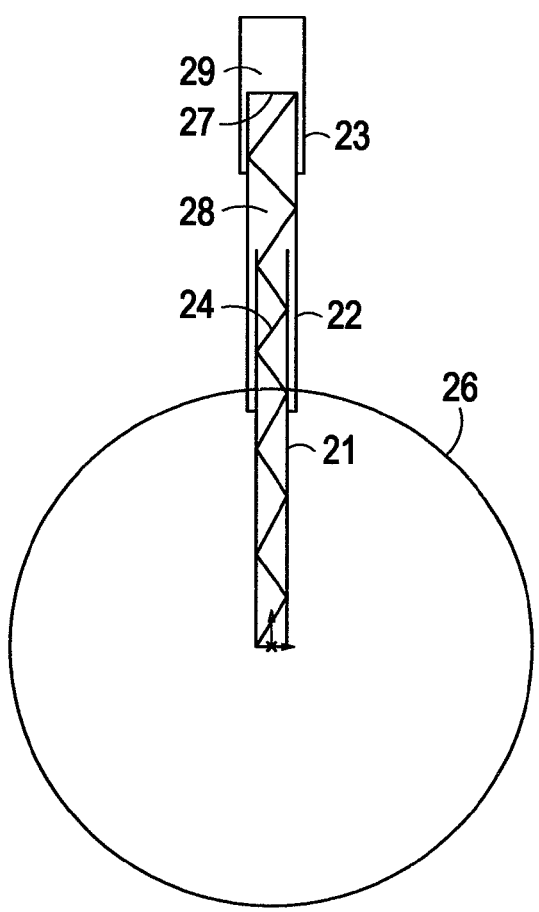

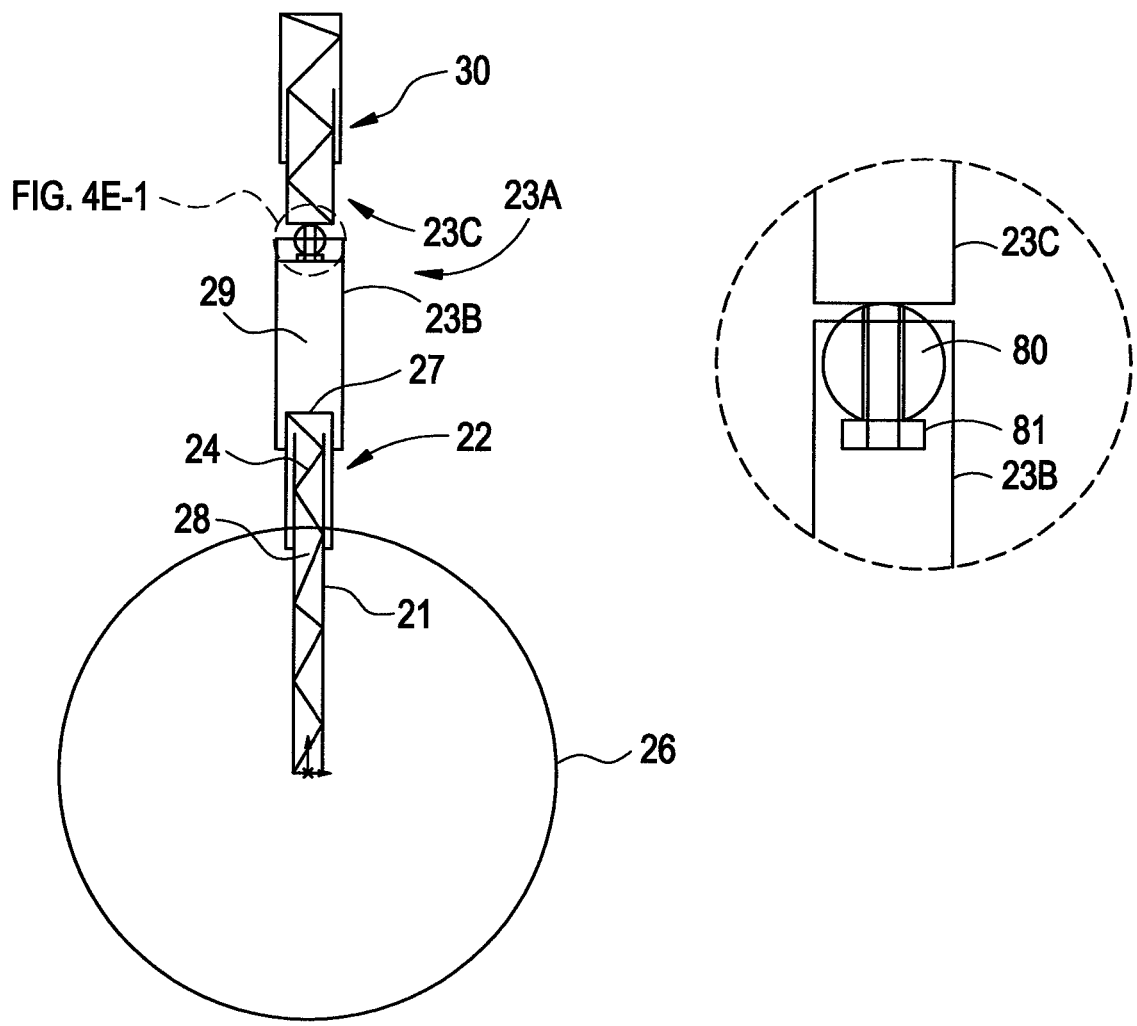

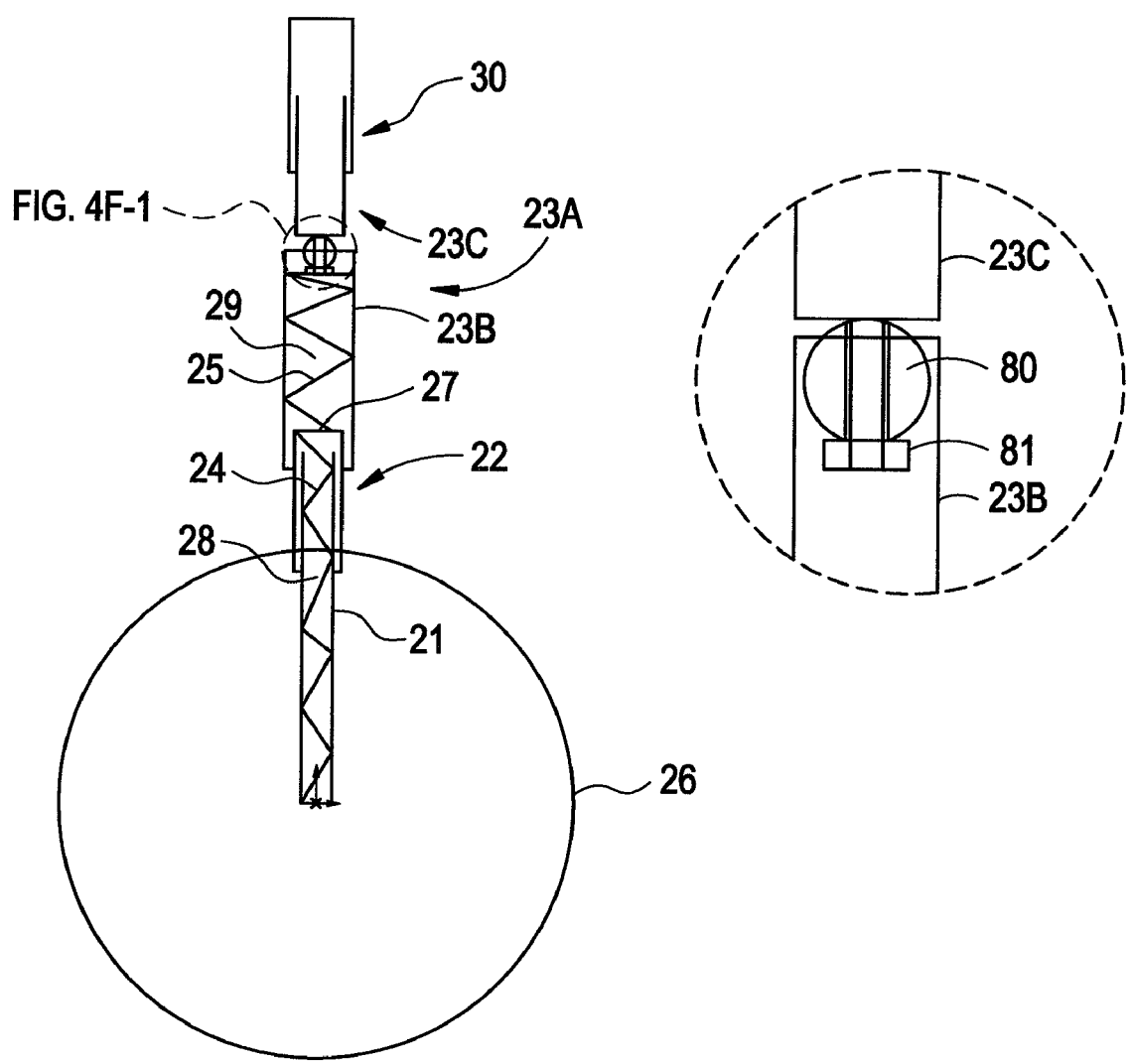

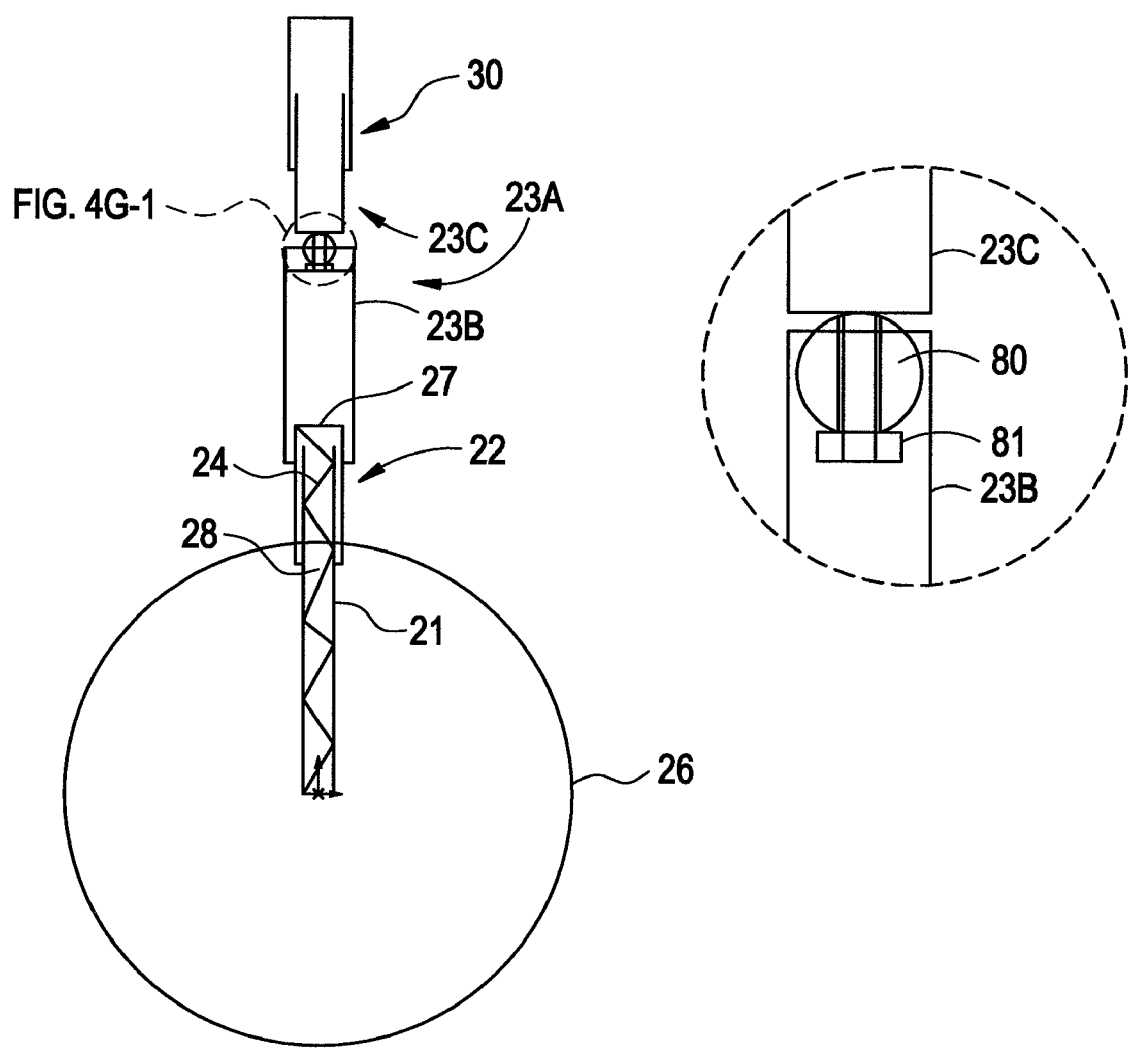

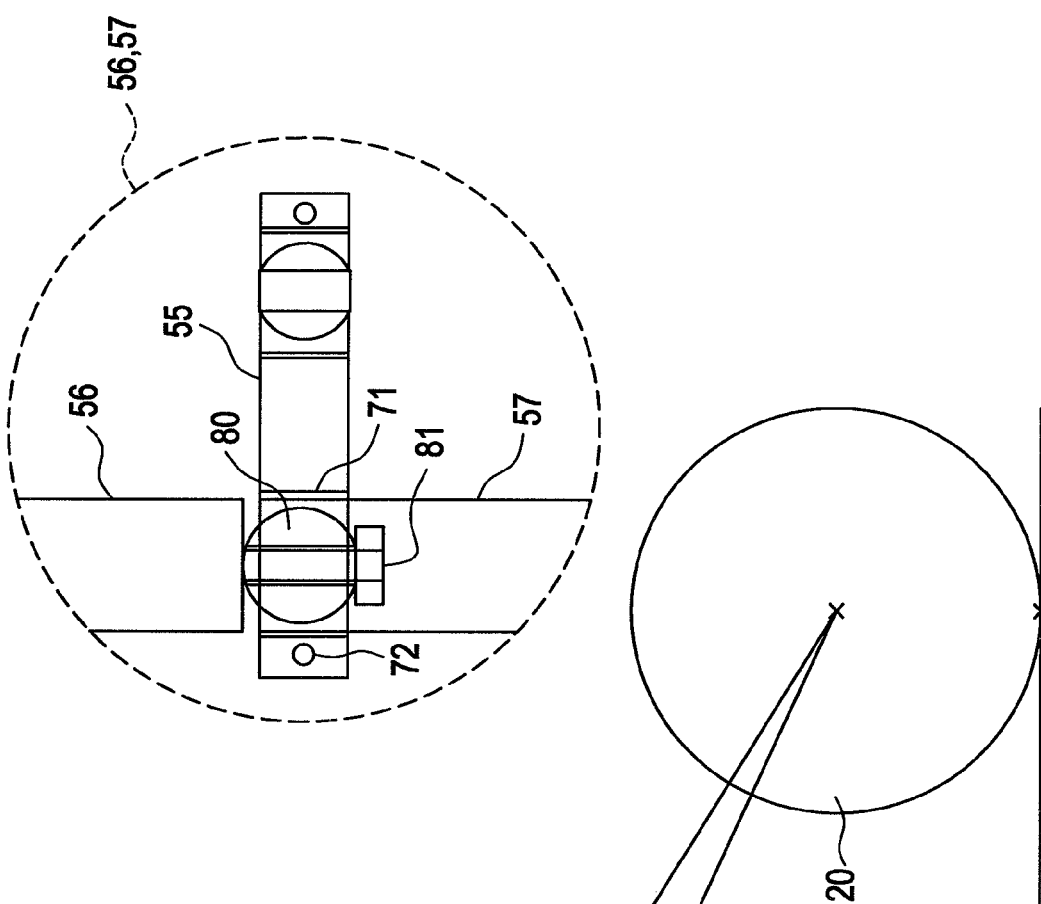
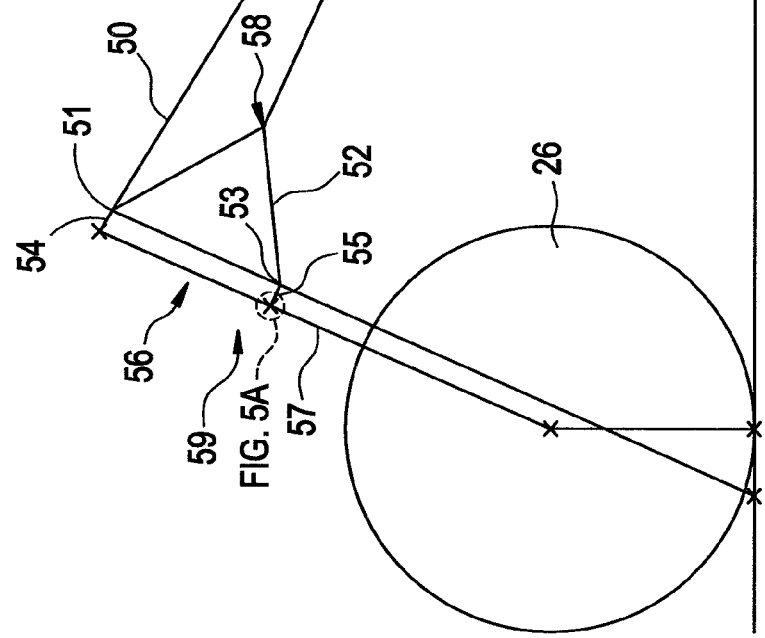

FRONT WHEEL SUSPENSION SYSTEM FOR VEHICLES HAVING A SINGLE FRONT WHEEL

This application is a divisional of U.S. application Ser. No. 10/628,536 filed Jul. 28, 2003 now U.S. Pat. No. 7,140,627 which claims the priority of German applications 202 11656.5 and 202 11655.7 filed Jul. 29, 2002 and German application 202 14757.6 filed Sep. 24, 2002.

BACKGROUND OF THE INVENTION

The invention relates to a front wheel suspension system and method for the front wheel of vehicles having a single front wheel, such as motorcycles, tricycles and bicycles.

Most known front-wheel suspension systems for the vehicles having a single front wheel have a fixed wheel-elevation curve that is predetermined by the overall vehicle construction. This fixed wheel-elevation curve is a curve along which the front wheel of the vehicle moves throughout the range of the suspension spring system. Thus, the values of the parameters which determine the driving behaviour of such vehicles, such as the steering-angle and trail, are determined by the construction of the suspension spring system within the range of the spring. Usually, the value for trail depends directly and geometrically on any steering-angle modification, since there is a fixed connection of the distance of the wheel-guidance means, such as a telescopic fork, to the steering axis.

Thus, for example, in a strong braking action of a motorcycle, the steering angle becomes steeper and the trail becomes shorter, and the motorcycle is therefore destabilized. In the case of a mountain bike with a large range of spring, the steering angle can become too steep and the trail too short when the bike is travelling downhill and simultaneously passing over a bump resulting in the biker having an increased risk of falling. In such a case, modifications in the setting of the range of spring can usually not achieve any change in the wheel-elevation curve, since the range of spring usually consists only of a single spring element which allows only for one elevation movement. Therefore, the telescopic fork is commonly used in front-wheel suspension systems for bicycles, tricycles and motorcycles, which systems consist of a frame and fork joints combined with a telescopic fork.

In the known frames for bicycles and motorcycles which allow for a change of the steering angle, such change is usually achieved by exchanging inserts providing different bearing points of a fixed connection of the two bearing points in the frame which determine the steering angle. Due to the necessary assembly work, this is highly time consuming. The fork joints for bicycles and motorcycles as known to date achieve such a possibility of changing the steering-head angle by means of special bearings. For this purpose, bearings such as single ball bearings or spherical roller bearings are used either in the area of the bearing of the steering axis or in the area of the connection between at least one fork leg and the fork joint. The thus achieved changes of trail are obtained by means of the modifications of the steering-head angle under compression, the initial value being determined by a fixed fork off-set between steering axis and fork-leg axis. Due to their special design, the use of the above described bearings is more expensive than conventional bearings such as simple roller bearings or tapered roller bearings, while potential changes of trail are mainly caused by the modification of the steering-head angle.

The known two-part telescopic forks for bicycles and motorcycles only provide for one single movement of the two connection elements over the course of compression and rebound of the springs when passing over bumps or when braking and accelerating. Therefore, in both driving situations, the same geometrical modifications of steering angle and front-wheel trail are obtained. This modification of frame geometry, which constantly and always remains the same even in different driving situations, makes an optimisation of driving behaviour adapted to the driving situation in the respective vehicles impossible.

As illustrated in FIGS. 12 and 13, in this known system, in the rebound position, a fixed steering angle or rake "R" is predetermined by means of a frame with a steering head. The trail "T" is also determined by means of the fixed distance of the steering axis, in relation to which the telescopic fork is usually disposed in parallel by means of so-called fork joints. Now, in compression to the maximum of the range of spring, the values for the steering angle change linearly in relation to the respective range of spring, and, along with the change of steering angle, the trail also changes linearly, that is, the steering angle becomes constantly steeper and the trail becomes constantly shorter.

There is therefore a need for an improved front wheel suspension system for the front wheel of vehicles having a single front wheel, such as motorcycles, tricycles and bicycles, that will overcome the foregoing described deficiencies of known systems.

SUMMARY OF THE INVENTION

The invention is a front-wheel suspension system for vehicles with one single front wheel sprung by a springing system, and comprises a system which by means of different measures of adjustment of the individual components can adapt quickly and easily to the respective field of application and driving situation, especially with regard to the values of steering angle and trail over the range of spring. It is mainly applicable for bicycles and motorcycles.

The front-wheel suspension system of the invention consists of a frame for bicycles, tricycles and motorcycles which allows for a modification of the steering angle by shifting the clamping connections of fork joints on a fork, the steering points of which are connected in at least one point to a swinging arm through a frame, and at least two fork joints of which at least one can also be fashioned as a two-part fork joint that allows for a steering-head angle and trail which is adjustable over the range of spring. In addition, the invention provides a novel spring unit, a telescopic fork for bicycles and motorcycles which allows for a shifting movement of the dipping and sliding connecting parts which is variable over the course of the range of spring. On the basis of a suitable setting of the different possibilities of relative adjustment of the frame, the fork joints and the spring units, the system provides many possibilities of adjustment. Especially with regard to the desired wheel-elevation curves, as defined by the parameters of steering angle and trail, adjustment options are now obtained by reason of the spring units, which differ substantially from such devices as known to date.

The system according to the invention thus consists of: (1) a frame with a variable arrangement of the steering points using at least one swingable arm; (2) multiple fork joints at least one of which can be designed as a two-part fork joint that provides for variable distances between the steering axis; and (3) a special telescopic fork connected to the front wheel and which has at least three parts so that the front wheel is guided through the entire system whether partly or fully sprung.

The invention also includes an embodiment of a frame, the steering-head angle of which is adjustable, and in which the adjustment can be achieved extremely fast by means of a simple shifting movement of a clamping connection of a fork joint.

According to the invention, the fork joint, due to its two-part form, makes a subdivision of the necessary rotating and swivelling movements. Thus, the fork joint on one hand allows for the use of less expensive bearings, and, on the other hand, depending on the particular embodiment, provides for the possibility of an additional change of trail, since it achieves a change of the fork off-set (that is, of the pivot point of the steering axis in relation to the geometrically relevant distance of the fork-leg axis in the fork joint) over the swivel area.

As specially used for motorcycles and bicycles, the construction of the telescopic fork of the invention consists of slidable connections, which are slidable into each other and which achieve compression and rebound of the front-wheel assembly during braking or acceleration as well as when passing over bumps. Due to the special form of the telescopic fork in at least three-parts, a different suitable relative movement of the individual connection parts can be achieved over the entire range of spring, always depending on the setting of the individual spring and damping rates of the connecting parts with respect to each other. Thus, in the compression and braking processes, an additional modification of the front-steering angle can be achieved over the course of the spring range, such as for example in connection with a variably suspended steering point, which modification differs from the known steering-angle modification as achieved by the compression of a conventional telescopic fork.

What is characteristic of the system of the invention is the combination of at least two spring elements which are adjustable independently from each other, the individual ranges of spring of the elements being added to one overall range of spring for the front wheel to be guided. This special arrangement therefore provides for variable frame geometries with regard to steering angle and trail. At least one of the spring elements needs to be attached in between at least one variably hinged steering point, which is supported by means of a swingable arm by the vehicle frame. Due to this modification of at least one range of spring, the steering axis is defined in relation to the frame by means of the respective arrangement of the at least one swingable arm, thus defining the corresponding steering angle of the frame. At least one second spring element is attached either directly to the lower fork joint alone, or within a telescopic fork which has at least a three-part form, the spring element is attached so that it guides the front wheel throughout its range of spring in relation to at least one swingable arm to which the variably hinged steering point is attached. When this second spring element compresses, the steering angle of the entire vehicle changes in relation to the level of the roadway as such.

Thus, the driving behaviour of the vehicle can be changed by adjusting the individual spring elements, which will vary the values of the critical parameters of steering angle and trail of the front-wheel suspension system. In other words, the selective arrangement of the individual spring elements can provide for respectively different geometrical modifications of the steering angle and trail which sum up over the overall range of spring of the front-wheel suspension system.

In the case of a direct connection between a wheel-guiding unit such as a telescopic fork, the bearings at the variable steering points have to allow for a rotating as well as a swivelling movement of the steering points through the use of fork joints. The fork joints can be designed as ball-and-socket joint bearings, spherical roller bearings or so-called uni-ball joints. In a preferred embodiment of the system of the invention, at least one fork joint, for example the upper one, is designed as a two-part fork joint, the bearing of which at the steering axis is designed conventionally such that only a steering movement, but no swivelling movement of this first part is possible. The second part of this special fork joint is connected to a spring unit by means of conventional clamping connections, for example to the upper one of a special telescopic fork. The two parts of the fork joint again are connected to each other by means of a swivel axis. During respective movement of at least two parts of a multiple part fork joints system when compressing, the distance between the special telescopic fork and the steering point of the fork joint designed in two parts is changed. Depending on the particular embodiment of the two-part fork joint, and especially with respect to the positioning of the swivel axis, an additional change of trail is obtained within the steering system, which change is independent from the change of trail depending on the steering-angle modification of the overall system in relation to the roadway level of the vehicle.

In another preferred embodiment of the invention, at least one further existing fork joint is designed in a two-part form. However, in this case, the swivel axis crosses the conventionally designed bearing at the steering-axis bearing point.

In a further preferred embodiment at least one further existing fork joint is designed in a two-part form, but in this case, the swivel axis crosses the center line of the special telescopic fork, with the bearing at the steering-axis bearing point being fashioned in a conventional way.

In yet another preferred embodiment the upper spring element is designed as a shock absorber, which bears against the swingable arm and the frame.

In still another embodiment, the system is described in its variations in combination with three spring elements which are adjustable independently from each other and which are in connection with each other by way of two swingable arms.

BRIEF DESCRIPTION OF THE DRAWINGS

FIG. 1*a* is a schematic view similar to FIG. 1 but showing in FIG. 1*a*1 a two-part fork joint at the upper fork joint and in FIG. 1*a*2 a ball and socket joint at the lower fork joint;

FIG. 1*b* is a schematic view similar to FIG. 1*a* but showing in FIG. 1*b*1 a ball and socket joint at the upper fork joint and in FIG. 1*b*2 a two-part fork joint at the lower fork joint;

FIG. 1*c* is a schematic view similar to FIG. 1*a* but showing in FIG. 1*c*1 a two-part fork joint at the upper fork joint and in FIG. 1*c*2 a two-part fork joint at the lower fork joint, the swivel axis of which crosses the steering point;

FIG. 1*d* is a schematic view similar to FIG. 1*c* but showing in FIG. 1*d*1 a two-part fork joint at the upper fork joint and in FIG. 1d2 a two-part fork joint at the lower fork joint, the swivel axis of which crosses the center line of the lower springing unit.

FIG. 2 is a schematic view similar to FIG. 1 but now showing the basic adjustment possibilities of rake and trail of a frame according to the invention through simply changing the clamping position of the lower fork joint relative to the telescopic fork;

FIG. 2A is a schematic view similar to FIG. 2 but showing another embodiment of the vehicle frame comprised of two movable swinging arms for steering head adjustments;

FIG. 4 is a schematic illustration of a three part telescopic fork;

FIG. 4A is schematic view similar to FIG. 4 but showing only the lower element containing a spring element;

FIG. 4B1 is an enlarged elevational view further showing the middle element and the connection of its two parts;

FIG. 4C1 is an enlarged elevational view further showing the middle element and the connection of its two parts;

FIG. 4D1 is an enlarged elevational view further showing the connection of two parts of two of the elements of the fork of FIG. 4D;

FIG. 4E is a schematic view of another embodiment of a four part fork with only the lower and the upper element containing a spring element;

FIG. 4E1 is an enlarged elevational view further showing the connection of two parts of two of the elements of the fork of FIG. 4E;

FIG. 4F is a schematic view of yet another embodiment of a four part fork with only the lower two elements containing a spring element;

FIG. 4F1 is an enlarged elevational view further showing the connection of two parts of two of the elements of the fork of FIG. 4F;

FIG. 4G is a schematic view of yet another embodiment of a four part fork with only the lowest element containing a spring element;

FIG. 4G1 is an enlarged elevational view further showing the connection of two parts of two of the elements of the fork of FIG. 4G;

FIG. 5 is a schematic view of the entire front wheel suspension showing use of the fork of FIG. 4B;

FIG. 5a is an enlarged elevational view of a portion of FIG. 5 and showing the lower joint of the fork;

DESCRIPTION OF THE PREFERRED EMBODIMENTS

System Design

Figure 3:
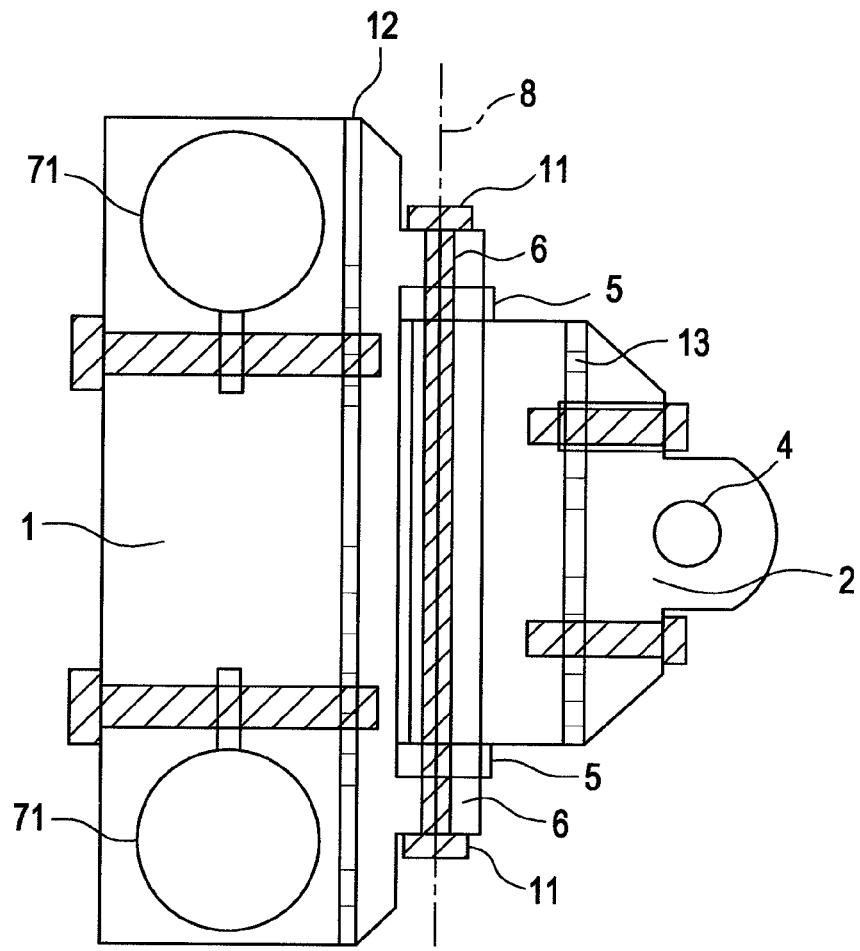
FIG. 3 is a plan view of a fork joint or triple clamp mechanism of the invention shown as used with a fork having two or three sliding wheel travel units.

The drawings illustrate the invention primarily in schematic form. Utilization of the principles of the inventions into the specific construction of two-wheeled vehicles would be obvious to persons skilled in the art. As shown in the drawings, the front-wheel suspension system of the invention consists of a frame 50 for bicycles and motorcycles that is supported on ground engaging wheels, a rear wheel 20 and a front wheel 26. FIG. 1 shows schematically the construction of the entire front-wheel suspension system which includes a frame 50. This novel type of frame is shown in FIG. 2 with a variation thereof in FIG. 2A and will be described in more detail hereinafter. It provides for easy general adjustment options for the basic steering angle, and thus has a fixed upper steering point 51 and a fixed suspension point 58. At the suspension point 58, a reversing lever or swingable arm 52 is operatively connected to a lower steering point 53. The frame 50 is provided with fork joints 54 and 55 at both steering points 51 and 53, which fork joints are disposed to provide both swayable and rotatable motion.

In the embodiment of FIG. 1, the bearing of steering points 51 and 53 is provided by means of a ball-and-socket insert 73, which is maintained within the fork joints 54 and 55 by at least one clamped screw connection 74 as shown in FIG. 1x. A spring unit 57 is mounted to the lower fork joint 55 and a spring unit 56 is mounted to the upper fork joint 54 by means of clamping connection 71 by way of a screw fitting which provides at least one screwed connection 72. Depending on the respective embodiment of the system, such as in a three-part telescopic fork with a direct connection for example, the axes of the clampings 71 of the spring units extend linearly. The fork joints 54 and 55 are connected to a special spring system 59 by way of clamping connections, which spring system 59 consists of at least two spring units 56 and 57 which are separate from each other. The ranges of spring of these spring units 56 and 57 add up to one overall range of spring of the suspension system. Depending on the adjustment of the individual setting in each individual spring unit 56 and 57, the system provides different changes of the values for steering-head angle and trail for the front wheel 26 to be guided.

Figure 3A:
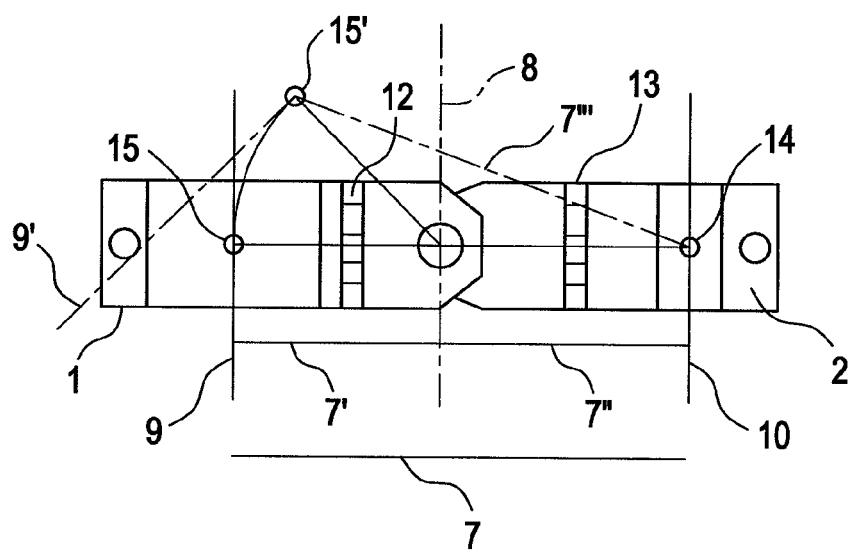
FIG. 3a is an end elevational view of the triple clamp mechanism of FIG. 3.

In the embodiment of FIG. 1, the spring system 59 is fashioned as a three-part telescopic fork which will be further described hereinafter with reference to FIG. 4. In addition, in further preferred embodiments according to FIGS. 1a-d, a special two-part fork joint is used for this purpose which provides for a variable trail. This novel two part fork joint, or sometimes referred to as a triple clamp, is shown in FIGS. 3 and 3a and will be described in more detail hereinafter.

FIG. 1a (and FIGS. 1a1 and 1a2) show a detailed representation of the use of the two-part fork joint (shown in detail in FIGS. 3 and 3a) at the top joint 54 and a conventional fork joint with a ball-and socket joint at the bottom joint 55.

FIG. 1b shows a detailed representation of the use of the two-part fork joint at the bottom joint 55 and a conventional fork joint with a ball-and-socket joint at the top joint 54.

FIG. 1c shows a detailed representation of the use of the two-part fork joint at the top joint 54 and a two-part fork joint at the bottom joint 55 in which the swivel axis crosses the steering point.

FIG. 1d shows a detailed representation of the use of the two-part fork joint at the top joint 54 and a two-part fork joint at the bottom joint 55 in which the swivel axis crosses the center line of the lower springing unit.

Frame Design

FIGS. 2 and 2A, show the easy adjustment possibilities for rake adjustment of the frame 50. The herewith suggested construction of a frame now makes it possible to carry out a modification of the steering angle in the shortest amount of time. The movable arrangement of at least one of the steering points 51 or 53 through a sliding arm 52 at frame 50 allows for the change of steering angle by way of a shift in longitudinal direction of a fork joint 55 comprising a clamping connection on a fork or telescopic fork 57 which can be provided in several different designs. In one embodiment, a bearing point 51 or 53 of the steering axis is provided in a movable position. In a further embodiment, both bearing points 53 and 53a of the steering axis are positioned movably by means of two swinging arms 52 and 52a.

Thus, as shown in FIG. 2, the bearing points 51 and 53 of the steering head which determine the steering head angle are not both affixed permanently to the frame 50 but at least one of them is affixed with one moveable steering point 53, e.g., in the axis of the steering head by the use of the reversing lever or swinging arm 52 which is pivotally connected at one end to the fixed front suspension point 58 of the frame 50 and at the other end to the steering point 53. The broken lines in FIG. 2 illustrate the change of rake achieved easily by moving the triple clamps on their clamped connection to any type of fork through the swinging movement of the arm 52 and the steering point 53 attached to it. In the embodiment of FIG. 2A, two bearing or steering points 53 and 53a of steering which determine the steering head angle are not affixed permanently, but are affixed with two moveable steering points 53 and 53a in the axis of the steering head by the use of two reversing levers or swinging arms 52 and 52a. In this case, fork joint 54 only takes over a steering function through a fixed steering point 51a.

The change of the steering angle can be achieved independently of the particular fork design being used. For example, in one embodiment, the change of the steering angle is obtained by means of a shift of the clamping connections of a fork joint in an upside-down telescopic fork. In another embodiment, the steering-angle modification is obtained by means of a shift of the clamping connections of a fork joint with a rigid fork (conventional front fork of a single telescoping design). In yet another embodiment, the steering-angle modification is obtained by a shift of the clamping connections of a fork joint in a three-part telescopic fork (double-telescoping of a three piece design). The fork joint and telescopic fork of the invention as used in these various embodiments will now be described.

Fork Joint Design

FIGS. 3 and 3a show the preferred embodiment of the invention of a fork joint, sometimes referred to as a triple clamp, for the front-wheel suspension system. A triple clamp is a device especially used for motorcycles and bicycles, and is a mechanical connection between a steering point axis to at least one fork leg. The fork joints for bicycles and motorcycles as known to date achieve such a possibility of changing the steering-head angle by means of special bearings. For this purpose, bearings such as single ball bearings or spherical roller bearings are used either in the area of the bearing of the steering axis or in the area of the connection between at least one fork leg and the fork joint. The thus achieved changes of trail are obtained by means of the modifications of the steering-head angle under compression, the initial value being determined by a fixed fork off-set between steering axis and fork-leg axis. In other words, known existing triple clamps for bicycles and motorcycles primarily allow for a change of trail only by a selection of off-setting devices which change a fixed base value of distance (called offset) between the vertical steering axis and the vertical centerline of the forkleg. Therefore, changes of geometric trail occur only as a function of offset to the steering head angle (rake) of the frame and through wheel travel according to suspension movement within telescoping front forks. Due to their special design, the use of the above described bearings is more expensive than conventional bearings such as simple roller bearings or tapered roller bearings, while potential changes of trail are mainly caused by the modification of the steering-head angle. In the now obtained special embodiment of the present construction of a fork joint, such fork joint, due to its two-part form, makes a subdivision of the necessary rotating and swivelling movements, and thus, on the one hand allows for the use of less expensive bearings, and, on the other hand, depending on the respective embodiment, it provides for the possibility of an additional change of trail, since it achieves a change of the fork off-set (that is, of the pivot point of the steering axis in relation to the geometrically relevant distance of the fork-leg axis in the fork joint) over the swivel area.

In the embodiment shown in FIGS. 3 and 3a, a fork joint part member 1, in this case comprising two clamping seats 71 for attaching the fork legs, is connected, for an angle modification to part or member 2 of said fork joint by means of at least one bore 6 and at least one axis bolt 11 on the swivel axis 8. Member 2 comprises one location hole 4 for connection with a pivoting point of the steering axis as well as at least one bearing seat 5 for receiving a conventional bearing (here, as an example, a tapered roller bearing) around swivel axis 8.

In parallel position of the axis of fork legs 9 (point 15 geometrically relevant) in relation to the steering axis 10 (point 14 supposed pivoting point), the geometrically fork off-set 7 is obtained by adding the distances of off-set 7' of the fork joint member 1 of the fork legs in relation to swivel axis 8 plus the off-set 7" of the fork joint member 2 of the swivel axis 8 in relation to steering axis 10. Thus, the fork joint of the invention is designed in a two-part form that allows for an angle modification between the steering axis and fork-leg axis by means of a swivel axis disposed between the two.

Owing to the now possible swivel movement around swivel axis 8, now the resulting distance of the geometrically relevant point 15 in relation to 15' of member 1 of the fork joint changes, such that the geometrically relevant portion of the fork offset 7''' (geometrical connection of point 15' with the center of rotation of the steering axis 14) is obtained depending on the respective angle modification between fork-leg axis 9' and steering axis 10. Therefore, the wheel trail of a wheel guided by the inventive fork joint is changed in addition to the angle modification of trail obtained by the mere change of the steering-head angle when compression takes place.

In two embodiments, the modification of the angle between the steering axis and fork-leg axis can result in the swivel axis 8 crossing either the vertical centreline of the steering axis or the fork leg axis. While these embodiments allow for the above described change of steering-head angle, the effect of additional change of trail however is limited.

In another embodiment, the swivel axis 8 can be disposed at an optional distance in between the geometrically relevant connection line of the steering axis and the resulting fork-leg axis.

In yet other embodiments, the swivel axis 8 can be disposed either: (1) behind the steering axis, at an optional distance outside the geometrically relevant direct connection line of the steering axis and the resulting fork-leg axis; or (2) in front of the fork-leg axis, at an optional distance outside the geometrically relevant direct connection line of steering axis and the resulting fork-leg axis. Depending on the position of the swivel axis 8, these embodiments can provide a more important change of trail than the possible embodiments described in the preceding paragraph.

In yet another embodiment, it possible to use flexible materials for the change of angle to take place.

The unique fork joint or triple clamp design of the invention allows an adjustment of length of the distance 7' for adjusting the trail-changing effect of the fork joint construction by using at least one adjustment plate 12 and also allows an adjustment of length of the distance 7" for adjusting the trail-changing effect of the fork-joint construction by using at least one adjustment plate 13. Thus, the triple clamp of the invention divides the necessary rotating and flexing movements to allow for changes in rake and trail through its design of two jointed parts, and permits the use of inexpensive bearings within. It also permits two static changes of geometric steering trail, one according to adjustment of the steering angle, and the other according to the constant flexible movement within the steering angle during flexing of the two joined parts of the triple clamp.

Telescopic Fork

With reference now to FIGS. 4, and 4A to 4C, the various embodiments of the three-part telescopic fork of the invention which allows an adjustable stroke of the moving parts will be described.

Currently known two-part telescopic forks for bicycles and motorcycles have been created for the vertical movement of compression and rebound only, without enough consideration for horizontal deflection and the ensuing constant alteration of rake and trail geometry. Therefore, the inability to alter the frame geometry during riding motion precludes the optimization of transgression during certain situations of acceleration, braking, or encounters with road/trail irregularities.

The known two-part telescopic forks for bicycles and motorcycles only provide for one single movement of the two connection elements over the course of compression and rebound of the springs when passing over bumps or when braking and accelerating. Therefore, in both driving situations, the same geometrical modifications of steering angle and front-wheel trail are obtained. The construction of the present telescopic fork consists of a slidable connection as specially used for motorcycles and bicycles, which is slidable into each other and which achieves compression and rebound of the front-wheel assembly during braking or acceleration as well as when passing over bumps. Due to the special form in at least three-parts, a different suitable relative movement of the individual connection parts can be achieved over the entire range of spring, always depending on the setting of the individual spring and damping rates of the connecting parts with respect to each other. Thus, in the compression and braking processes, an additional modification of the front-steering angle can be achieved over the course of the spring range, such as for example in connection with a variably suspended steering point, which modification differs from the known steering-angle modification as achieved by the compression of a conventional telescopic fork.

During the overall stroke of the telescopic front fork of the invention, there now exists the opportunity to constantly change the front steering angle of a two-wheeled vehicle, especially when this front fork is used in conjunction with a fork joint that provides for non-rigid connection between the frame unit and the steering unit of the vehicle.

Moreover, through the design of the three-piece telescopic fork of the invention, the benefits of flexible steering and frame geometry can be achieved with linked adjustments between the frame and the fork. And the additional benefit of increased strength is realized due to the overall increased rigidity of significantly overlapped pieces.

In a general embodiment of FIG. 4, the lower connecting part 21 of the telescopic fork, which is connected to the guidable front wheel 26 over an axle, is slid into or around the middle connecting element 22, which in turn is slid into or around the upper connecting element 23. In this embodiment, the enhanced flexural strength is mainly achieved due to a larger overlapping of the individual connecting elements with each other.

In a further embodiment, the lower connecting part 21 is supported by a spring 24 which fits closely against the partition wall 27 of connecting element 22, which connecting element 22 in turn is supported by a spring 25 at connection element 23. Since the lower connecting part 21 is supported by the middle connecting element 22 by means of spring 24, the lower connecting part 21 will shift depending on a respective load, while the middle connecting element 22 which is supported by the upper connecting element 23 also by means of a spring 25, will also shift according to the load. Depending on the adjustment of the individual spring rates in springs 24 and 25, different relative movements of the connecting elements 21, 22 and 23 to each other are obtained over the entire course of the spring range.

In a special embodiment, the working chambers 28 and 29 of the telescopic fork are separated from each other not only with respect to spring action but also regarding the damping effect produced by controlled damping devices with adjustments for flow rates. This provides for further additional adjustment options. This embodiment provides two separate working chambers for springing and damping action, which, owing to different adjustments in the respective spring rates and damping rates, cause a different amount of dipping movement in the respective tubes over the entire range of spring of the telescopic fork to take place In yet another embodiment, instead of conventional springs a pressurized gas is used as a spring.

In a further embodiment shown in FIG. 4A, only the lower element 21 of the three-part telescopic fork is designed as a spring element, the upper element 23 being designed only as a guiding element without a spring. In this embodiment, a working chamber 29 is formed between the middle element 22 and the upper element 23 and is used for damping purposes, while a working chamber 28 is formed between the lower element 21 and the middle element 22 and is used for both damping and springing action.

Figure 4B:
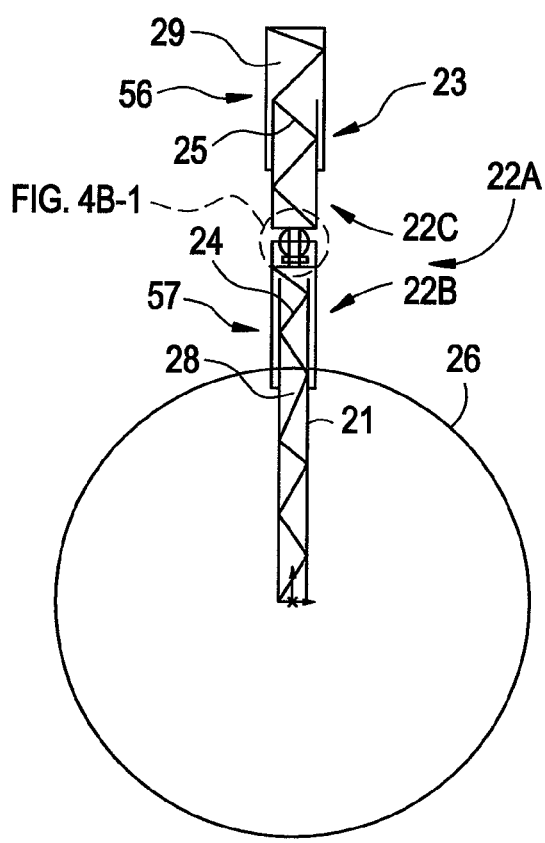
FIG. 4B is a schematic view similar to FIG. 4 but showing another embodiment of the fork.
Figures 1, 4B:
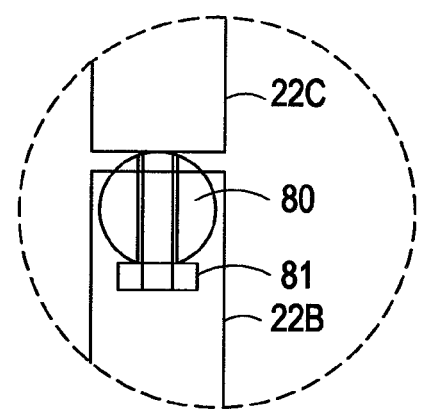
FIG. 1 is a schematic view of an embodiment of the invention showing the entire front wheel suspension system, FIG. 1*x* being an enlarged plan view that illustrates a conventional fork joint with a ball-and socket joint at the steering axis.
Figure 4C:
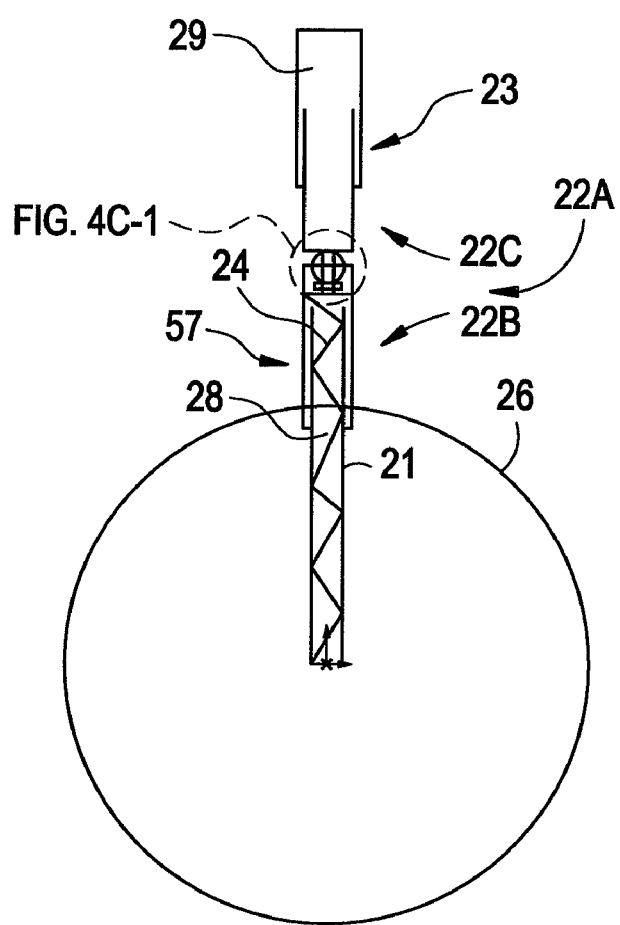
FIG. 4C is a schematic view similar to FIG. 4B but showing another embodiment of the fork with only the lower element containing a spring element.
Figures 1, 4C:
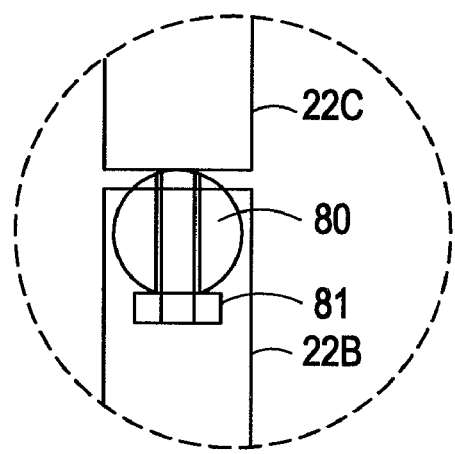

FIG. 4B illustrate another embodiment of a three-part telescopic fork, and FIG. 4C shows a variation of the embodiment of FIG. 4B. In the embodiment according of FIG. 4B, the middle connection element 22A is fashioned in a two-part form. Its parts 22B and 22C are, for example, connected with each other by means of a ball-and-socket joint 80 (See FIG. 4B1). Here, connection element 22B and lower connection element 21 form the first spring element 57, while connection element 22C and upper connection element 23 form the second such spring element 56.

In the embodiment according to FIG. 4C, the middle connection element 22A is fashioned in a two-part form. Its parts 22B and 22C are, for example, connected with each other by means of a ball-and-socket joint 80 (See FIG. 4C1). In this embodiment, connection element 22B and lower connection element 21 form a spring unit, and connection element 22C and upper connection element 23 form a slidable guiding unit.

In FIGS. 4D to 4G four embodiments of a four-part telescopic fork are described. These embodiment are used in embodiments of the overall front-wheel suspension system according to FIGS. 7 to 11.

Figures 1, 4D:
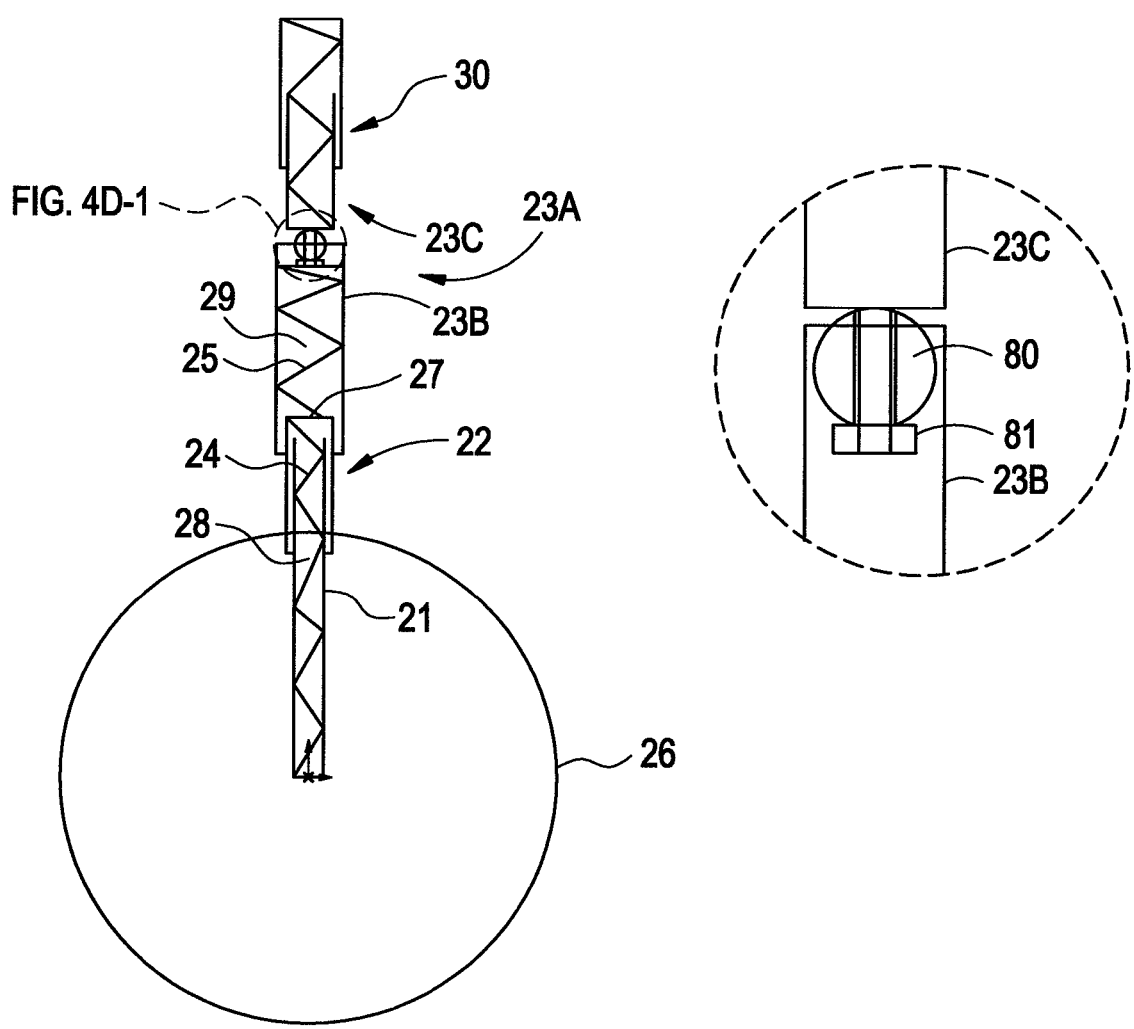
FIG. 4D is a schematic view of a four part fork.

In the embodiment of FIG. 4D, a four-part telescopic fork is shown in which a third connection element 23a is designed in two parts. These second and third parts 23b and 23c are connected to each other by means of a ball-and-socket joint 80 as illustrated in FIG. 4D1. Part 23b and connection element 22 form a second, middle spring unit, connection element 23c and the fourth connection element 30 form a third, upper spring unit. Thus, between the lower connecting element 21 and the second connection element 22 as well as between the connecting element 22 and the second part 23b and also between the third part 23c and the fourth connecting element 30, three different working chambers are formed for springing and damping effects, which by means of different adjustment measures of the respective spring rates and damping rates provide for a different degree of dipping of the respective tubes over the overall range of spring.

In the embodiment according to FIG. 4E, in the working chamber between the connection elements part 23b and second connection element 22, which are slidable into each other, there is formed only a guiding unit without providing any springing effect there being no spring in this working chamber, In the embodiment according to FIG. 4F, the third connection element 23a is comprised of two parts. These second and third parts 23b and 23c are connected to each other by means of a ball-and-socket joint 80 as illustrated in FIG. 4F1. The third part 23c and the fourth connection element 30, which are respectively slidable into each other, form a guiding unit only without providing any springing effect.

In the embodiment according FIG. 4G, the second part 23b and the second connection element 22 and the third part 23c and fourth connection element 30, which are slidable respectively into each other, merely represent guiding units without providing any springing effect.

In any of the foregoing embodiments, the springing units can use a pressurized gas as a spring, instead of conventional springs.

Combinations of Components of the System

FIG. 5 shows a schematic of an embodiment of the system providing a connection of the spring units 56 and 57 by way of a ball-and socket joint 80 (FIG. 5a) and a telescopic fork arranged according to FIG. 4B. Here, the ball-and-socket joint 80 is mounted inside the spring unit 57 and is screwed down with the spring unit 56 by means of the screw fitting 81. Here, it is of no importance that the ball-and-socket connection 80 is disposed within the fork joint 55. It is crucial, however, that the spring unit 57, which preferably can be a telescopic fork of any type of embodiment, is connected and mechanically fixedly to the fork joint 55.

Figure 6:
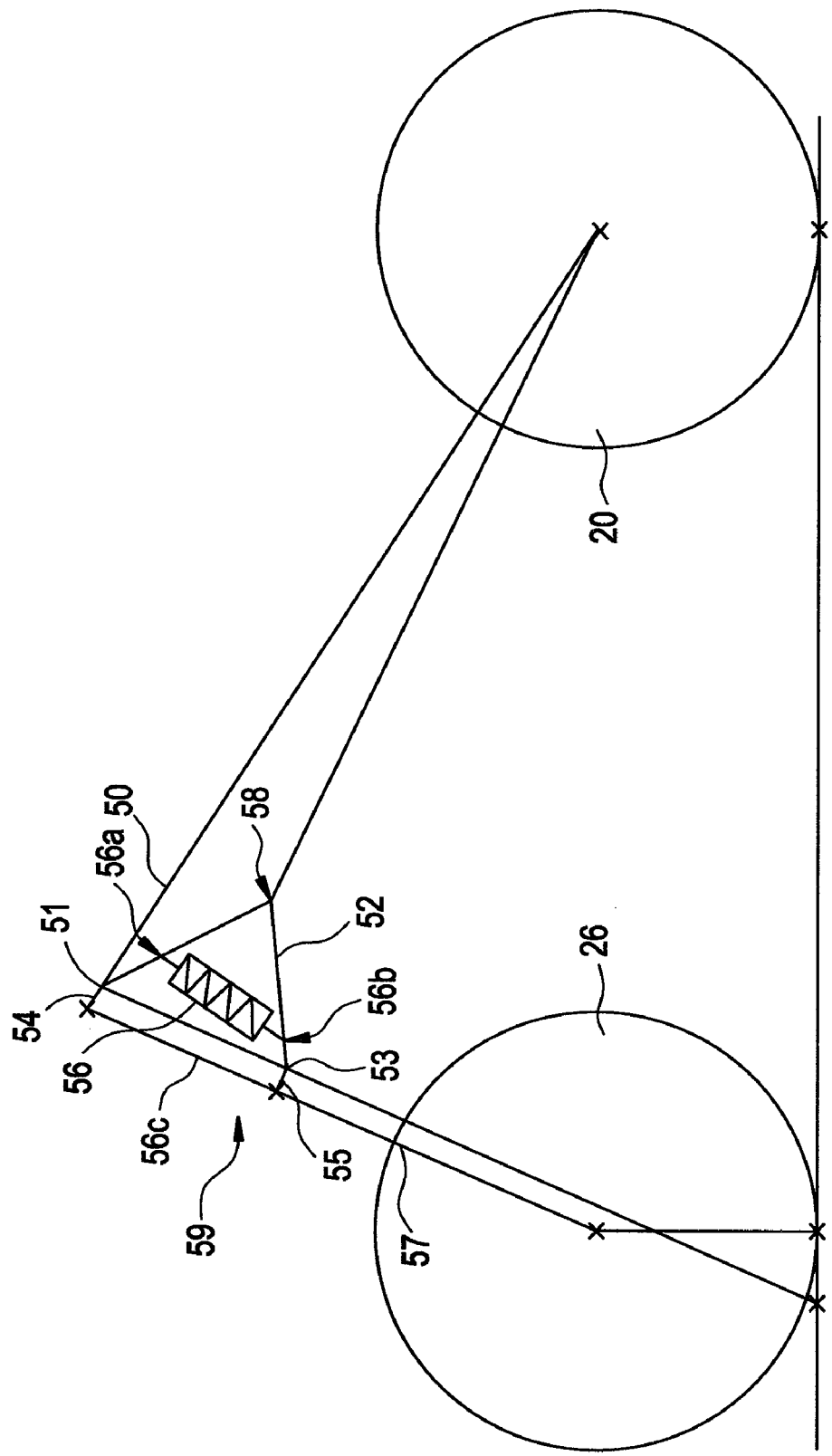
FIG. 6 is a schematic view of the front wheel suspension showing an embodiment using a monoshock suspension and showing use of the fork of FIG. 4A.

In FIG. 6, an embodiment of the system is shown, in which the spring unit 56 is a monoshock suspension, which bears against the frame 50 through attachment point 56a and against the swingable arm 52 through attachment point 56b. In this case, unit 56c is a guiding unit consists of two tubes which are slidable into each other and which do not perform any springing function (e.g., the telescopic fork of FIG. 4A). The tubes of guiding unit 56c serve solely to transmit the steering forces from the handlebar (not shown) of the vehicle to the front wheel 26. Here, a direct connection can exist between guiding unit 56c and spring unit 57. The guiding unit 56c however, can also be connected to spring unit 57 through a ball-and-socket joint, as described in FIG. 5a (e.g., the telescopic fork of FIG. 4C).

Figure 7:
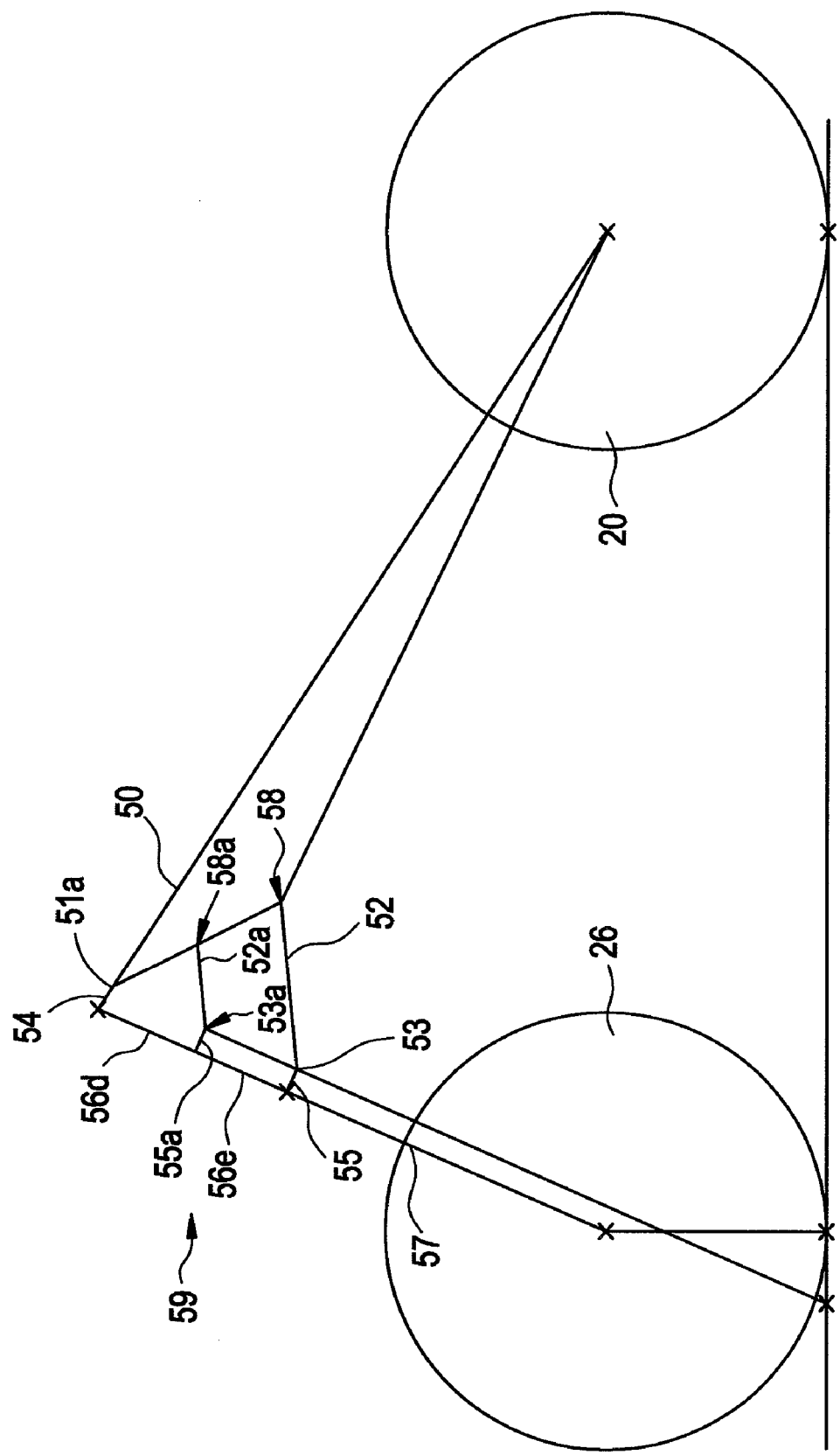
FIG. 7 is a schematic view of the front wheel suspension showing an embodiment using a second swingable arm in the suspension and showing use of the fork of FIG. 4D.

FIG. 7 shows an embodiment of a spring system 59, which beyond the existing swingable arm 52 provides a second swingable arm 52a which is pivotally connected to frame 50 through a suspension point 58a. At the other end of the swingable arm 52a the steering point 53a is provided, which together with steering point 53 of swingable arm 52 now represents the steering axis of the suspension. Extending over a third fork joint 55a, the overall springing of the spring system 59 is subdivided into three spring units 56d, 56e and 57 and thus allows for additional wheel elevation curves for the entire front-wheel suspension system with reference to the steering-head angle and the trail. In this embodiment, fork joint 54 only takes over a steering function through steering point 51a. The structure of this fork joint 54 can be designed as described in FIG. 3. The connection of springing units 56e and 57 can be carried out by means of a telescopic fork system as described in FIG. 4D, for example. Then, the attachment of the spring unit 56d to spring unit 56e has to correspond to that shown in FIG. 5a.

Figure 8:
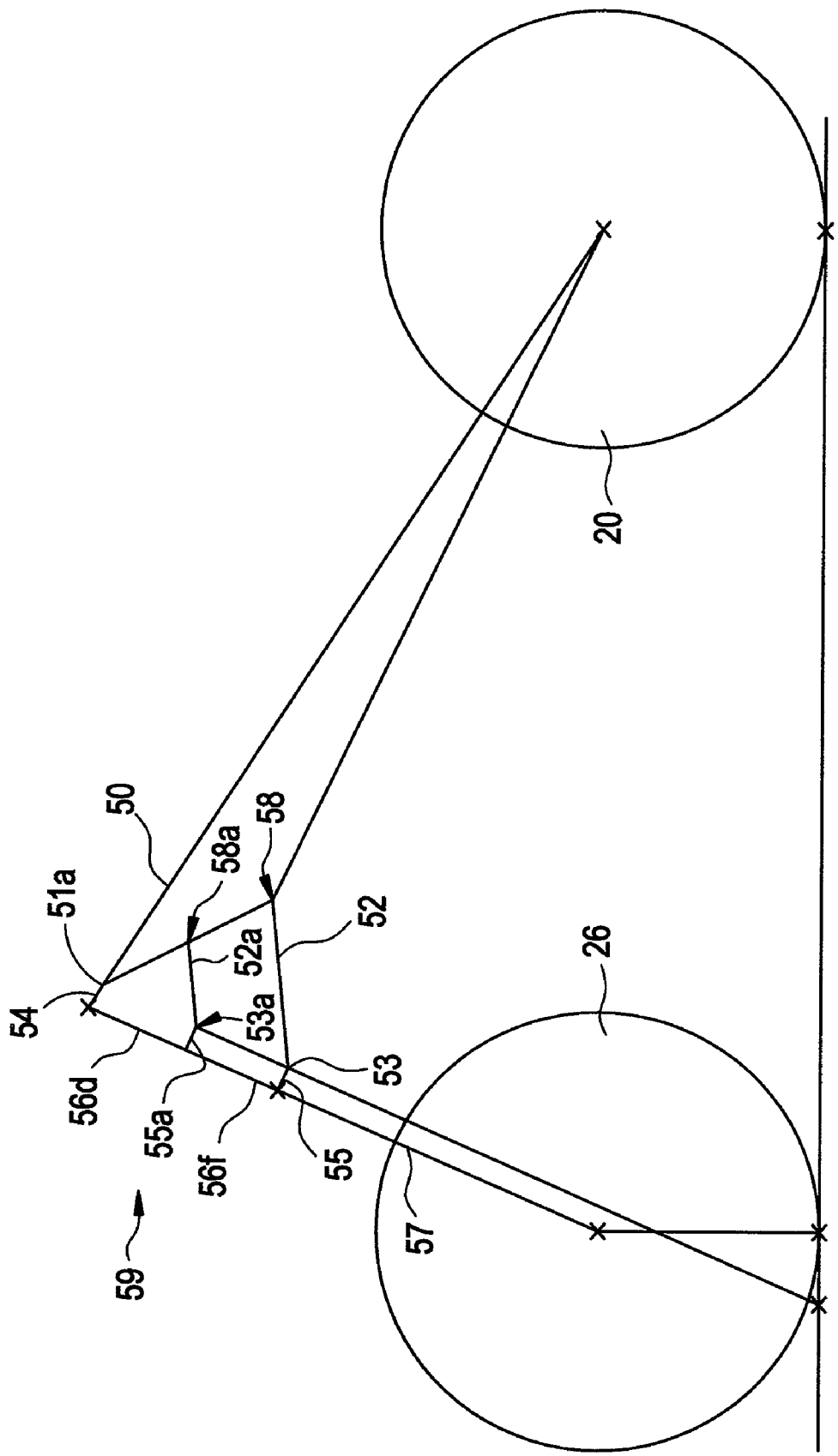
FIG. 8 is a schematic view of the front wheel suspension showing an embodiment using the fork of FIG. 4 and thus having a rigid element in the fork between the two swingable arms.

In the system as shown in FIG. 8, the unit 56f is designed rigidly without providing for any springing effect. The telescopic fork used thus corresponds to a three-part telescopic fork such as that shown in the embodiment of FIG. 4B. In this embodiment, the changes in relation to the steering angle and trail are obtained from an adjustment of the lengths of the swingable arms 52 and 52a and their suspension points 58 and 58a. The overall range of spring of the front wheel 26 within the front-wheel suspension system is then defined by means of the resulting ranges of spring of the spring units 56d and 57.

Figure 9:
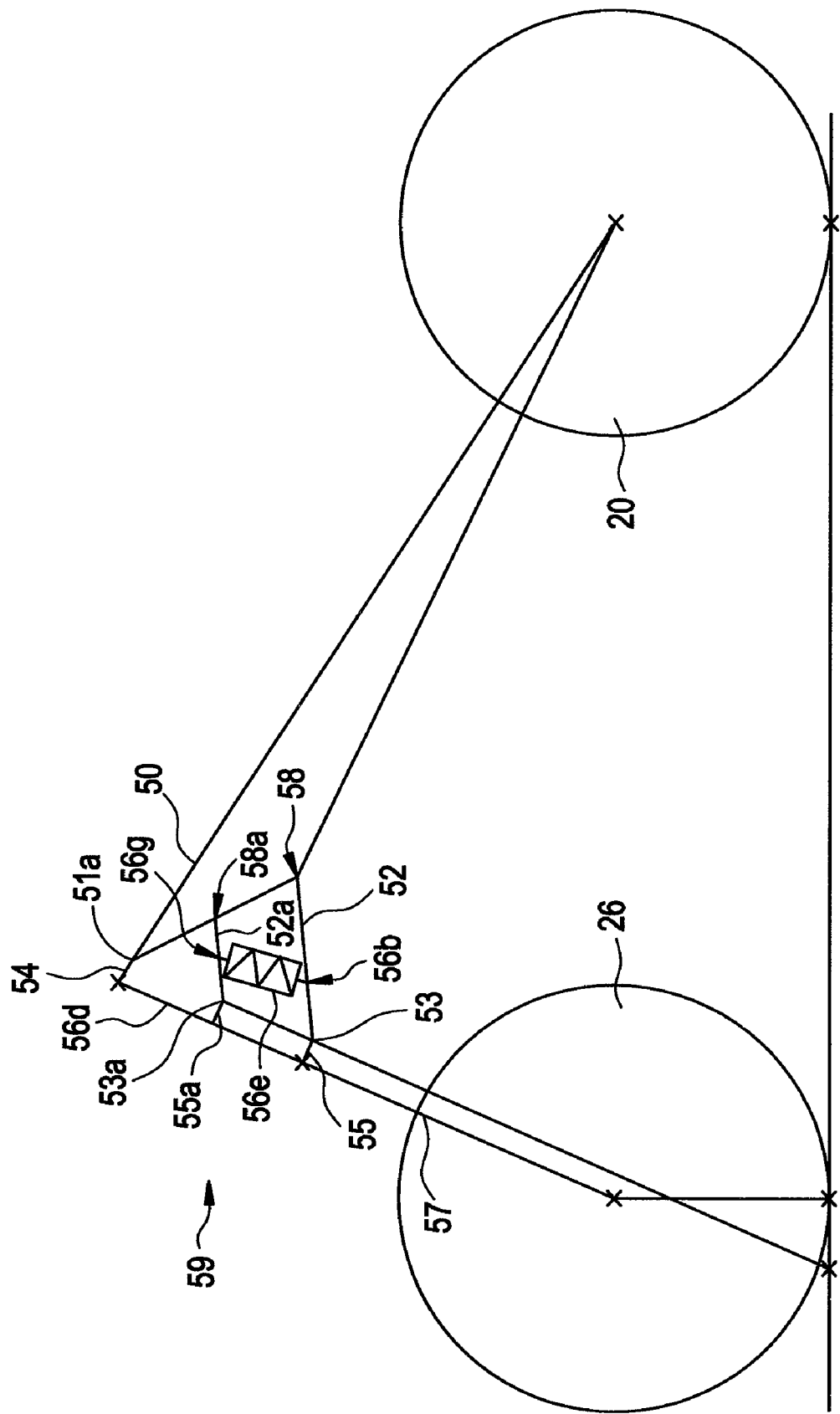
FIG. 9 is a schematic view of the front wheel suspension showing an embodiment using a second swingable arm in the suspension combined with a monoshock suspension unit and showing use of the fork of FIG. 4E.

In a variation of the system according to FIG. 9, the spring unit 56e can also be designed as a monoshock suspension unit and can bear against swingable arm 52 through coupling point 56b and can bear against swingable arm 52a through coupling point 56g. In that case, the connection parts 23b and 22 of the telescopic fork merely take on guiding functions within the system, but do not provide for any springing effect, as described in the embodiment of FIG. 4E.

Figure 10:
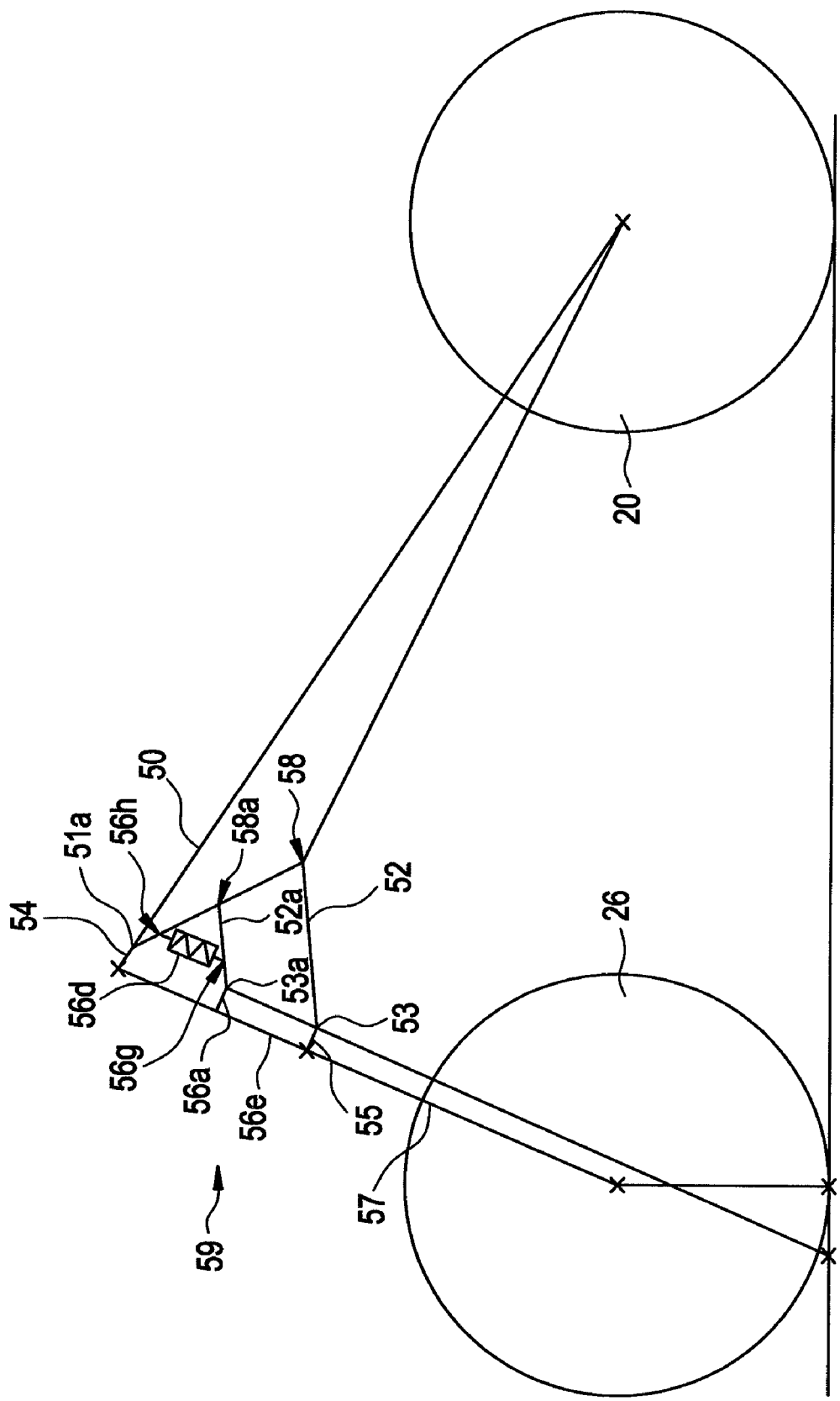
FIG. 10 is a schematic view of the front wheel suspension showing an embodiment similar to the embodiment of FIG. 9 but showing a variation thereof using a monoshock suspension unit and showing use of the fork of FIG. 4F.

In another variation of the system shown in FIG. 10, the spring unit 56d can also be designed as a monoshock suspension unit and can bear against swingable arm 52a through a coupling point 56g and against the frame 50 through coupling point 56h. In that case, the connection parts 23c and 30 of the telescopic frame only take on guiding functions within the system, but do not provide any springing effect, as described in the embodiment of FIG. 4F.

Figure 11:
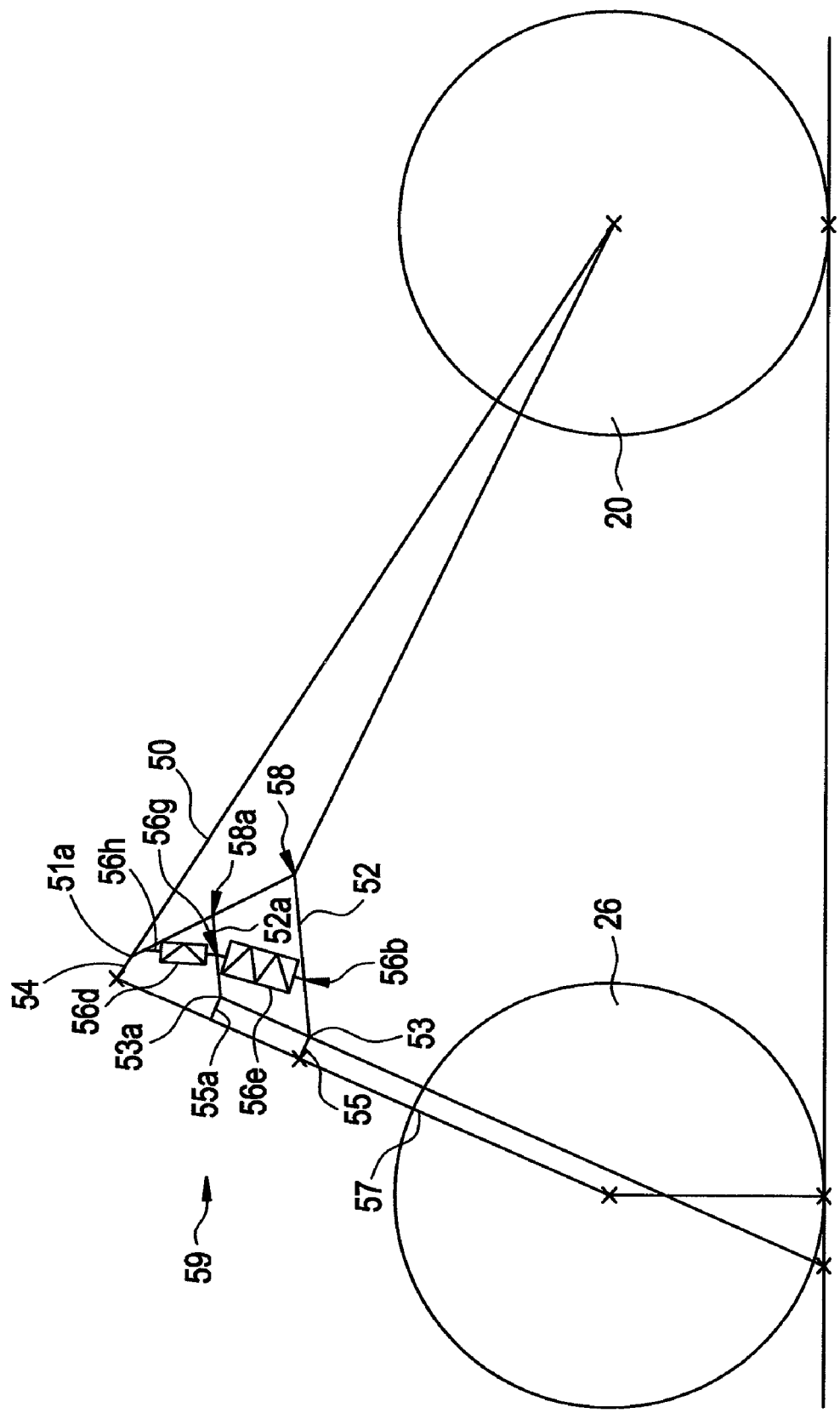
FIG. 11 is a schematic view of the front wheel suspension showing an embodiment similar to the embodiment of FIGS. 9 and 10 but showing a variation thereof showing two spring elements using a monoshock suspension unit and showing use of the fork of FIG. 4G.
Figure 13:
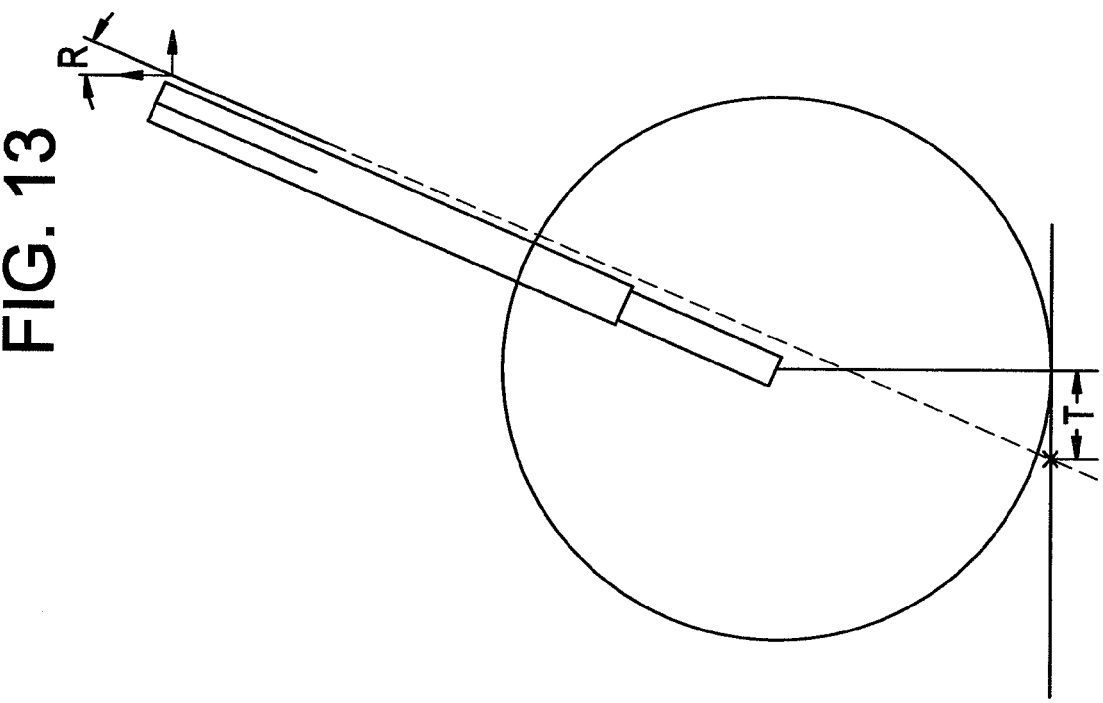
FIG. 13 is a schematic view of a regular fork illustrating rake and trail geometrically.
Figure 12:
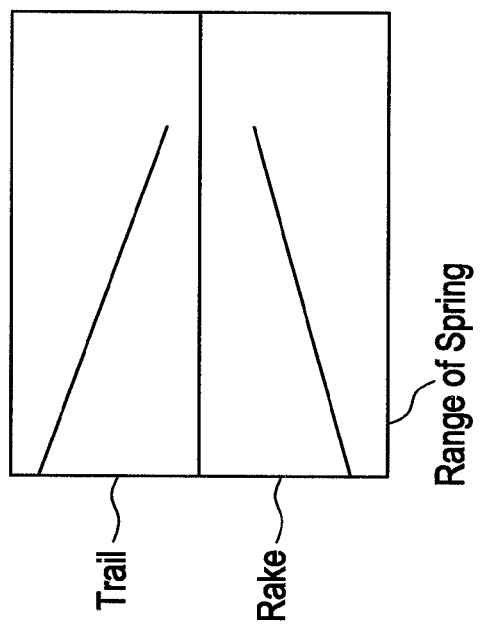
FIG. 12 is a diagram illustrating the relationship of rake and trail and the range of spring of a regular fork shown in FIG. 13.

In yet another variation of the system shown in FIG. 11, the two spring units 56d and 56e also can be designed as monoshock suspension units and can bear against swingable arm 52a through coupling point 56g and against frame 50 through coupling point 56h as well as against swingable arm 52 through coupling point 56b and against swingable arm 52a through coupling point 56g. In this case, the connecting parts 23c and 30 and connecting parts 23b and 22 of the telescopic fork only take on guiding functions within the system, but do not provide for any spring effect, as described in the embodiment of FIG. 4G.

Summary

The unique suspension system of the invention for bicycles and motorcylces allows for an adjustable change of steering angle through its componensts, especially by dividing the springing movement of a front wheel during suspension action into at least two partly springing movements. Those are adjustable and at least one of them is located in between the steering triple clamp brackets while at least the other one must be connected below the lower steering triple clamp bracket. When the steering points of said brackets are connected to the frame by a swing arm in at least one location of the frame, an additional and adjustable change of rake occurs. The construction of the frame is a solution for the design of a frame utilizing an adjustable steering head, whose adjustment may be performed quickly and easily, through selective positioning of steering triple clamp brackets. The construction of the frame allows for a change of the steering head angle in a very short time frame. By the use of variable steering points in conjunction with a swing arm to a frame, the steering triple clamp bracket is able to be moved along the axial centerline of a fork or telescopic fork of any design, to achieve a change of steering angle.

The construction of a flexing, two-part triple clamp as described herein allows for the increased stability of a bicycle or motorcycle. By allowing articulating movement within the triple clamp, an additional resultant changing geometric function of trail occurs. When used in conjunction with the steering-to-frame link system, a change of geometrically relevant rake is offered, and increased stability of the vehicle is achieved during braking or going over bumps. Additionally, the use of inexpensive bearings is possible, as opposed to bearings commonly used in the steering components of motorcycles and bicycles using conventional one-piece rigid triple clamps allowing these changes.

In addition, the construction of a multiple-piece telescopic fork and its variations as described herein allows for a significant number of chosen resistances between the movement of its connected parts. These inter-related parts, when used in conjunction with linked arms, provide increased stabilization of steering during acceleration and deceleration, and increased control during moving encounters with road irregularities.

The foregoing disclosure of various preferred embodiments is considered as illustrative only of the principles of the invention. Further, since numerous modifications and changes will readily occur to those skilled in the art, it is not desired to limit the invention to the exact construction and operation shown and described, and accordingly, all suitable modifications and equivalents evident to those skilled in the art shall be considered to that fall within the scope of the invention as defined in the following claims. It is also important that the claims be regarded as including such equivalent constructions insofar as they do not depart from the spirit and scope of the present invention.

What is claimed is as follows:

1. A front-wheel suspension system for the guidance and springing of the front wheel of wheeled vehicles having a single front wheel, said suspension system comprising:
   a frame supported on the vehicle wheels, the frame providing a fixed front suspension point and a fixed steering point;
   a swingable arm operatively connected at one end to the fixed front suspension point and providing a variable second steering point at the other end of the arm;
   the fixed steering point and the second steering point defining the steering axis;
   a fork operatively combined with the frame and having at least one fork leg for connection to the front wheel of the vehicle, the fork having a longitudinal axis;
   a first lower fork joint operatively connecting the fork to the fixed steering point; and
   a second upper fork joint spaced from the first fork joint along the longitudinal axis of the fork, the second fork joint operatively connecting the fork to the frame at the second steering point provided by the swingable arm;
   the second upper fork joint being adjustably movable along the axis of the fork to thereby change the angle of the steering axis relative to the frame.

2. The front wheel suspension system of claim 1 in which the fork is a two part telescopic fork having two connection elements movable relative to each other.

3. The front wheel suspension system of claim 1 in which the fork is a three part fork, including a lower connection element connected to the front wheel of the vehicle, a middle connection element connected to the lower fork joint and an upper connection element connected to the upper fork joint, the lower connection element being slidable relative to the middle connection element in a first working chamber, the middle connection element being slidable relative to the upper connection element within a second working chamber, and a pressurized gas is contained within each of the working chambers to provide a spring.

4. A front-wheel suspension system for the guidance and springing of the front wheel of wheeled vehicles having a single front wheel, said suspension system comprising:
   a frame supported on the vehicle wheels, the frame providing a fixed front suspension point and a fixed steering point;
   a swingable arm operatively connected at one end to the fixed front suspension point and providing a variable second steering point at the other end of the arm;

the fixed steering point and the second steering point defining the steering axis;

a fork operatively combined with the frame and having at least one fork leg for connection to the front wheel of the vehicle, the fork having a longitudinal axis and the fork being a two part telescopic fork having two connection elements movable relative to each other;

a first fork joint operatively connecting the fork to the fixed steering point; and a second fork joint spaced from the first fork joint along the longitudinal axis of the fork, the second fork joint operatively connecting the fork to the frame at the second steering point provided by the swingable arm;

the second fork joint connected to the swingable arm being adjustably movable along the axis of the fork to thereby change the angle of the steering axis relative to the frame.

5. The front wheel suspension system of claim 4 in which the first fork joint is an upper fork joint, the fixed steering point being operatively connected to the upper fork joint, and the second fork joint is a lower fork joint, the second steering point of the swingable arm being operatively connected to the lower fork joint.

6. A front-wheel suspension system for the guidance and springing of the front wheel of wheeled vehicles having a single front wheel, said suspension system comprising:

a frame supported on the vehicle wheels, the frame providing a fixed front suspension point and a fixed steering point;

a swingable arm operatively connected at one end to the fixed front suspension point and providing a variable second steering point at the other end of the arm;

the fixed steering point and the second steering point defining the steering axis;

a fork operatively combined with the frame and having at least one fork leg for connection to the front wheel of the vehicle, the fork having a longitudinal axis;

a first lower fork joint operatively connecting the fork to the fixed steering point; and a second upper fork joint spaced from the first fork joint along the longitudinal axis of the fork, the second fork joint operatively connecting the fork to the frame at the second steering point provided by the swingable arm;

the second upper fork joint being adjustably movable along the axis of the fork to thereby change the angle of the steering axis relative to the frame; and the fork is a three part fork, including a lower connection element connected to the front wheel of the vehicle, a middle connection element connected to the lower fork joint and an upper connection element connected to the upper fork joint, the lower connection element being slidable relative to the middle connection element in a first working chamber, the middle connection element being slidable relative to the upper connection element within a second working chamber.

7. The front wheel suspension system of claim 6 in which a pressurized gas is contained within each of the working chambers to provide a spring.

8. The front wheel suspension system of claim 6 in which the fork lower connection element is supported by the middle connection element by a spring in the first working chamber and the second working chamber serves only as a guiding element for damping purposes, and there is a monoshock connected between the swingable arm and the frame.

9. The front wheel suspension system of claim 6 in which the middle connection element is formed in two parts, a lower part and an upper part connected by a ball and socket, joint the lower part of the middle connection element defining a working chamber with the lower connection element and containing a spring the upper part of the middle connection element defining a working chamber with the upper connection element that serves only as a guiding element for damping purposes, and there is a monoshock connected between the swingable arm and the frame.

10. A front-wheel suspension system for the guidance and springing of the front wheel of wheeled vehicles having a single front wheel, said suspension system comprising:

a frame supported on the vehicle wheels, the frame providing a fixed front suspension point and a fixed steering point;

a swingable arm operatively connected at one end to the fixed front suspension point and providing a variable second steering point at the other end of the arm;

the fixed steering point and the second steering point defining the steering axis;

a fork operatively combined with the frame and having at least one fork leg for connection to the front wheel of the vehicle, the fork having a longitudinal axis;

a first upper fork joint operatively connecting the fork to the fixed steering point;

a second lower fork joint spaced from the first fork joint along the longitudinal axis of the fork, the second fork joint operatively connecting the fork to the frame at the second steering point provided by the swingable arm;

the second fork joint connected to the swingable arm being adjustably movable along the axis of the fork to thereby change the angle of the steering axis relative to the frame; and the fork is a three part fork, including a lower connection element connected to the front wheel of the vehicle, a middle connection element connected to the lower fork joint and an upper connection element connected to the upper fork joint, the lower connection element being slidable relative to the middle connection element in a first working chamber, the middle connection element being slidable relative to the upper connection element within a second working chamber, and a pressurized gas is contained within each of the working chambers to provide a spring.

11. A front-wheel suspension system for the guidance and springing of the front wheel of wheeled vehicles having a single front wheel, said suspension system comprising:

a frame supported on the vehicle wheels, the frame providing a fixed front suspension point and a fixed steering point;

a swingable arm operatively connected at one end to the fixed front suspension point and providing a variable second steering point at the other end of the arm;

the fixed steering point and the second steering point defining the steering axis;

a fork operatively combined with the frame and having at least one fork leg for connection to the front wheel of the vehicle, the fork having a longitudinal axis;

a first upper fork joint operatively connecting the fork to the fixed steering point; and a second lower fork joint spaced from the first fork joint along the longitudinal axis of the fork, the second fork joint operatively connecting the fork to the frame at the second steering point provided by the swingable arm;

the second fork joint connected to the swingable arm being adjustably movable along the axis of the fork to thereby change the angle of the steering axis relative to the frame; and the fork is a three part fork, including a lower connection element connected to the front wheel of the vehicle, a middle connection element connected to the lower fork joint and an upper connection element connected to the upper fork joint, the lower connection element being slidable relative to the middle connection element in a first working chamber, the middle connection element being slidable relative to the upper connection element within a second working chamber;

the fork lower connection element being supported by the middle connection element by a spring in the first working chamber and the second working chamber serves only as a guiding element for damping purposes, and there is a monoshock connected between the swingable arm and the frame.

12. A front-wheel suspension system for the guidance and springing of the front wheel of wheeled vehicles having a single front wheel, said suspension system comprising:

a frame supported on the vehicle wheels, the frame providing a fixed front suspension point and a fixed steering point;

a swingable arm operatively connected at one end to the fixed front suspension point and providing a variable second steering point at the other end of the arm;

the fixed steering point and the second steering point defining the steering axis;

a fork operatively combined with the frame and having at least one fork leg for connection to the front wheel of the vehicle, the fork having a longitudinal axis;

a first upper fork joint operatively connecting the fork to the fixed steering point; and a second lower fork joint spaced from the first fork joint along the longitudinal axis of the fork, the second fork joint operatively connecting the fork to the frame at the second steering point provided by the swingable arm;

the second fork joint connected to the swingable arm being adjustably movable along the axis of the fork to thereby change the angle of the steering axis relative to the frame; and the fork is a three part fork, including a lower connection element connected to the front wheel of the vehicle, a middle connection element connected to the lower fork joint and an upper connection element connected to the upper fork joint, the lower connection element being slidable relative to the middle connection element in a first working chamber, the middle connection element being slidable relative to the upper connection element within a second working chamber;

the middle connection element being formed in two parts, a lower part and an upper part connected by a ball and socket joint, the lower part of the middle connection element defining a working chamber with the lower connection element and containing a spring the upper part of the middle connection element defining a working chamber with the upper connection element that serves only as a guiding element for damping purposes, and there is a monoshock connected between the swingable arm and the frame.

13. A three part fork, for use with the front-wheel suspension system for the guidance and springing of the front wheel of wheeled vehicles having a single front wheel, the telescopic fork comprising:

a lower connection element connected to the front wheel of the vehicle;

a middle connection element;

an upper connection element; and the middle connection element being formed in two parts, a lower part and an upper part connected by a ball and socket joint:

the lower connection element being slidable relative to the first part of the middle connection element in a first working chamber, and the second part of the middle connection element being slidable relative to the upper connection element within a second working chamber, the second working chamber containing no spring and serving only as a guiding element for damping purposes, the first working chamber containing a spring.

14. The three-part fork of claim 13 in which a pressurized gas is contained within the first working chamber to provide the spring.

15. A three part fork, for use with the front-wheel suspension system for the guidance and springing of the front wheel of wheeled vehicles having a single front wheel, the telescopic fork comprising:

a lower connection element connected to the front wheel of the vehicle;

a middle connection element;

an upper connection element; and the middle connection element being formed in two parts, a lower part and an upper part connected by a ball and socket joint:

the lower connection element being slidable relative to the first part of the middle connection element in a first working chamber, and the second part of the middle connection element being slidable relative to the upper connection element within a second working chamber, and a pressurized gas is contained within each of the working chambers to provide a spring.

* * * * *